US010375504B2

(12) United States Patent
Sridhara et al.

(10) Patent No.: US 10,375,504 B2
(45) Date of Patent: Aug. 6, 2019

(54) MECHANISM TO OUTPUT AUDIO TO TRIGGER THE NATURAL INSTINCTS OF A USER

(71) Applicant: QUALCOMM Incorporated, San Diego, CA (US)

(72) Inventors: Srivathsa Sridhara, Bhadravathi (IN); Ravi Shekhar, Thubarahalli (IN); Vishal Agarwal, Ramnagar (IN); Giriraj Goyal, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/840,917

(22) Filed: Dec. 13, 2017

(65) Prior Publication Data
US 2019/0182610 A1 Jun. 13, 2019

(51) Int. Cl.
*H04S 7/00* (2006.01)
*H04B 17/318* (2015.01)
*H04W 4/80* (2018.01)

(52) U.S. Cl.
CPC ............ *H04S 7/303* (2013.01); *H04B 17/318* (2015.01); *H04R 2420/07* (2013.01); *H04S 2400/11* (2013.01); *H04W 4/80* (2018.02)

(58) Field of Classification Search
CPC . H04S 7/303; H04S 2400/11; H04R 2420/07; H04B 17/318; H04W 4/80
See application file for complete search history.

(56) References Cited

U.S. PATENT DOCUMENTS

| 6,975,731 | B1 * | 12/2005 | Cohen | H04R 5/04 381/26 |
|---|---|---|---|---|
| 9,332,523 | B2 | 5/2016 | Zhang et al. | |
| 2009/0046864 | A1 * | 2/2009 | Mahabub | H04S 7/30 381/17 |
| 2009/0052703 | A1 * | 2/2009 | Hammershoi | H04S 7/302 381/310 |
| 2011/0075857 | A1 | 3/2011 | Aoyagi et al. | |

(Continued)

FOREIGN PATENT DOCUMENTS

EP 3253078 A2 12/2017
JP 2011091703 A 5/2011

OTHER PUBLICATIONS

International Search Report and Written Opinion—PCT/US2018/062637—ISA/EPO—Mar. 7, 2019.

*Primary Examiner* — David L Ton
(74) *Attorney, Agent, or Firm* — Arent Fox, LLP and Qualcomm, Incorporated

(57) ABSTRACT

There is a need to enable a wireless device to output signals such that the natural instincts of the user may be triggered. The present disclosure provides a solution by enabling a wireless device to determine a time delay and intensity difference associated with an audio output at a subset output devices based at least in part on a perceived spatial placement of at least one signal, a position of the transmitting device, and/or a signal strength associated with the signal. Using the time delay and the intensity difference, the output devices farthest from the transmitting device may output the at least one signal using the time delay and the intensity difference such that the user may detecting differences in the sound wave's time of arrival and intensity at the left ear versus the right ear, and thus, perceive the location of the audio source.

48 Claims, 13 Drawing Sheets

(56) References Cited

U.S. PATENT DOCUMENTS

| | | | |
|---|---|---|---|
| 2012/0213375 A1* | 8/2012 | Mahabub | H04S 5/00 |
| | | | 381/17 |
| 2013/0024018 A1 | 1/2013 | Chang et al. | |
| 2013/0094683 A1* | 4/2013 | Hansen | G09B 21/04 |
| | | | 381/309 |
| 2015/0373477 A1* | 12/2015 | Norris | H04M 1/72572 |
| | | | 381/303 |
| 2015/0382127 A1 | 12/2015 | Sun et al. | |
| 2016/0223640 A1 | 8/2016 | Vilermo et al. | |
| 2016/0370450 A1 | 12/2016 | Thorn et al. | |
| 2017/0228935 A1 | 8/2017 | Foster et al. | |

* cited by examiner

MECHANISM TO OUTPUT AUDIO TO TRIGGER THE NATURAL INSTINCTS OF A USER

BACKGROUND

Field

The present disclosure relates generally to communication systems, and more particularly, to a mechanism for outputting audio packets at a wireless device in order to trigger the natural instincts of a user.

Background

A wireless personal area network (WPAN) is a personal, short-range wireless network for interconnecting devices centered around a specific distance from a user. WPANs have gained popularity because of the flexibility and convenience in connectivity that WPANs provide. WPANs, such as WPANs based on short-range communication protocols (e.g., a Bluetooth® (BT) protocol, a Bluetooth® Low Energy (BLE) protocol, a Zigbee® protocol, etc.), provide wireless connectivity to peripheral devices within a specific distance (e.g., 5 meters, 10 meter, 20 meters, 100 meters, etc.) from a central device.

Short-range wireless communication protocols may be used to support communication between the central device (e.g., a master device) and at least one peripheral device (e.g., a slave device) within a WPAN. For example, BT communications may be used to transmit signals from a transmitting device (e.g., central device) to a wireless device (e.g., peripheral device) located within a specific range of the transmitting device. In certain scenarios, enabling the wireless device to output the signal in a way that triggers the natural instincts of the user (e.g., of the wireless device) may be beneficial.

Thus, there is a need to enable the wireless device to output received audio packets in order to trigger the user's natural instincts to perceive the location of a sound source.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Sound source localization is a person's ability to identify the location or origin of a detected sound. Binaural hearing (e.g., hearing with two ears) enables a person to determine sound source localization by detecting differences in the sound wave's time of arrival at the left ear versus the sound wave's time of arrival at the right ear, and the difference in the sound wave's intensity at the left ear versus the sound wave's intensity at the right ear.

In certain scenarios, enabling the wireless device to output an audio signal in a way that enables the user to determine sound source localization associated with the transmitting device and/or audio source may be beneficial.

Thus, there is a need to enable the wireless device to output received audio packets in order to trigger the user's natural instincts to perceive the location of a sound source.

The present disclosure provides a solution by enabling a wireless device to determine a time delay and intensity difference associated with an audio output at a subset output devices at the wireless device based at least in part on a perceived spatial placement of at least one signal, a position of the transmitting device, and/or a signal strength associated with the signal.

Using the time delay and the intensity difference, the output devices farthest from the transmitting device may output the at least one signal using the time delay and the intensity difference such that the user may detect differences in the sound wave's time of arrival and intensity at the left ear versus the right ear, and thus, perceive the location of the transmitting device and/or audio source.

In an aspect of the disclosure, a method, a computer-readable medium, and an apparatus are provided. The apparatus may include a first device with a plurality of output devices. In certain configurations, the apparatus may receive at least one signal from a second device. In certain other configurations, the apparatus may determine a perceived spatial placement of the at least one signal with respect to one or more of the first device or the second device. In certain other configurations, the apparatus may determine a signal strength associated with the at least one signal. In certain other configurations, the apparatus may determine a position of the second device relative to the first device based at least in part on a first reference point associated the first device or a second reference point associated with the second device. In certain other configurations, the apparatus may determine a time delay associated with an audio output at a subset of the plurality of output devices based at least in part on the perceived spatial placement of the at least one signal. In certain other configurations, the apparatus may determine an intensity difference associated with the audio output at the subset of the plurality of output devices based at least in part on one or more of the position of the second device or the signal strength associated with the at least one signal. In certain other configurations, the apparatus may output audio at the plurality of output devices. In certain aspects, the audio may be output at the subset of the plurality of output devices based at least in part on the time delay and the intensity difference.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
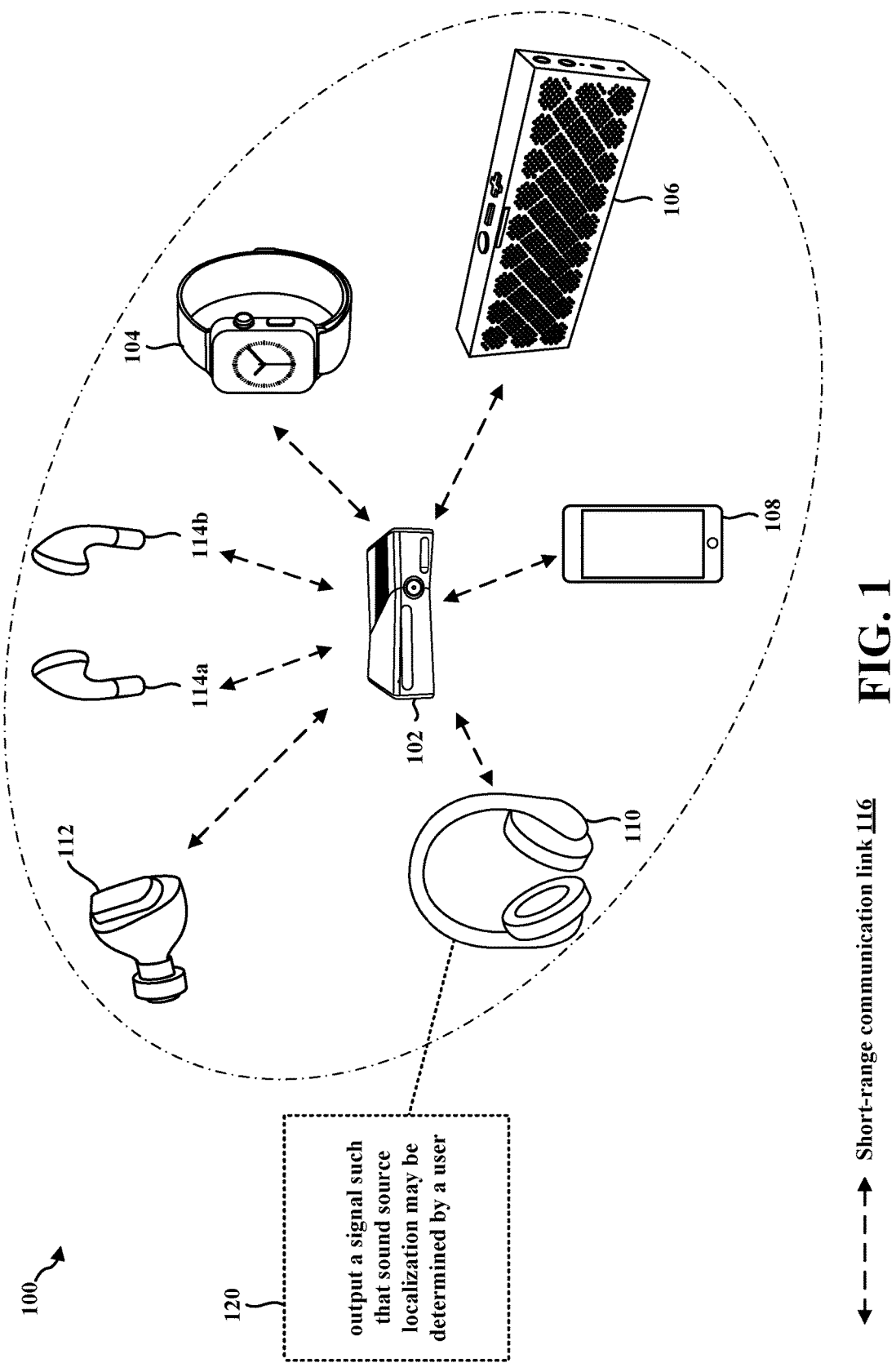
FIG. 1 is a diagram illustrating an example of a WPAN in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. Such apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a central device 102 may connect to and establish a short-range communication link 116 with one or more peripheral devices 104, 106, 108, 110, 112, 114a, 114b using a short-range communication protocol. One example of a short-range communication protocol that may be used is the BT protocol, which enables radio frequency communication operating within the globally accepted 2.4 GHz Industrial, Scientific & Medical (ISM) band.

The central device 102 may include suitable logic, circuitry, interfaces, processors, and/or code that may be used to communicate with one or more peripheral devices 104, 106, 108, 110, 112, 114a, 114b using a short-range communication protocol as described below in connection with any of FIGS. 2-7.

Examples of the central device 102 may include a game system (e.g., augmented related game system, virtual reality game system, etc.), a game controller, an emergency broadcast system, a safety broadcast system, a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a tablet, a smart device, a wearable device (e.g., smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, 114a, 114b may include an augmented reality head set, a virtual reality head set, wireless headphones, wireless earbuds, a speaker system, a cellular phone, a smart phone, a SIP phone, a STA, a laptop, a PC, a desktop computer, a PDA, a satellite radio, a global positioning system, a multimedia device, a video device, a digital audio player (e.g., MP3 player), a camera, a game console, a tablet, a smart device, a wearable device (e.g., smart watch, etc.), a vehicle, an electric meter, a gas pump, a toaster, a thermostat, a hearing aid, a blood glucose on-body unit, an IoT device, or any other similarly functioning device. Although the central device 102 is illustrated in communication with seven peripheral devices 104, 106, 108, 110, 112, 114a, 114b in the WPAN 100, the central device 102 may communicate with more or fewer than seven peripheral devices without departing from the scope of the present disclosure.

Referring again to FIG. 1, in certain aspects, the peripheral device 104, 106, 108, 110, 112, 114a, 114b may be configured to output a signal received from the central device 102 such that sound source localization may be determined by a user (120), e.g., as described below in connection with any of FIGS. 2-7.

Figure 2:
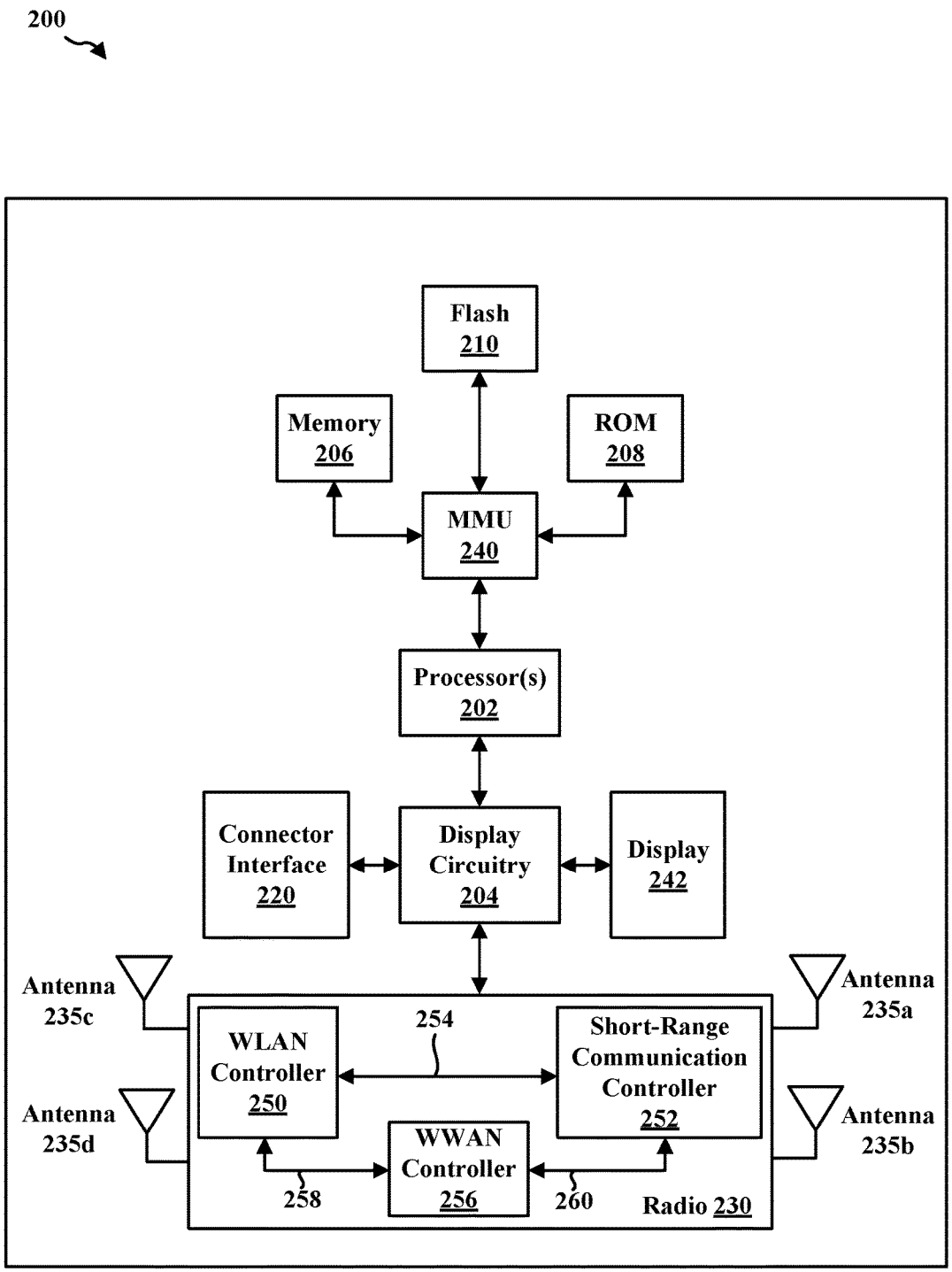
FIG. 2 is block diagram of a wireless device in accordance with certain aspects of the disclosure.

FIG. 2 is block diagram of a wireless device 200 in accordance with certain aspects of the disclosure. The wireless device 200 may correspond to, e.g., the central device 102, and/or one of peripheral devices 104, 106, 108, 110, 112, 114a, 114b described above in connection with FIG. 1. In certain aspects, the wireless device 200 may be a short-range communication enabled device such as wireless headphones or wireless earbuds.

As shown in FIG. 2, the wireless device 200 may include a processing element, such as processor(s) 202, which may execute program instructions for the wireless device 200. The wireless device 200 may also include display circuitry 204 which may perform graphics processing and provide display signals to the display 242. The processor(s) 202 may also be coupled to a memory management unit (MMU) 240, which may be configured to receive addresses from the processor(s) 202 and translate the addresses to address locations in memory (e.g., memory 206, ROM 208, Flash memory 210) and/or to address locations in other circuits or devices, such as the display circuitry 204, radio 230, connector interface 220, and/or display 242. The MMU 240 may be configured to perform memory protection and page table translation or set up. In some embodiments, the MMU 240 may be included as a portion of the processor(s) 202. In certain configurations, one or more of the processor(s) 202, memory 206, ROM 208, and/or Flash memory 210 may access one or more look-up table(s) that includes a correlation of time delays to perceived spatial placements (e.g., angle of arrival (AoA), angle of departure (AoD), etc.) of a received signal, and a correction of output intensities (e.g., loudness) to received signal strength indicators (RSSIs), perceived spatial placements, and/or positions of the transmitting device (not shown in FIG. 2) relative to the wireless device 200.

As shown, the processor(s) 202 may be coupled to various other circuits of the wireless device 200. For example, the wireless device 200 may include various types of memory, a connector interface 220 (e.g., for coupling to the computer system), the display 242, and wireless communication circuitry (e.g., for Wi-Fi, BT, BLE, cellular, etc.). The wireless device 200 may include a plurality of antennas 235a, 235b, 235c, 235d, for performing wireless communication with, e.g., wireless devices in a WPAN. The different phases of a signal that are respectively received by each of the antennas 235a, 235b, 235c, 235d may be used by the processor(s) to determine a perceived spatial placement of the signal.

In certain aspects, the wireless device 200 may include hardware and software components (a processing element) configured to output a signal received from the transmitting device such that sound source localization may be determined by a user of the wireless device 200, e.g., using the techniques described below in connection with any FIGS. 3-7. The wireless device 200 may also comprise BT firmware or other hardware/software for controlling BT operations.

The wireless device 200 may be configured to implement part or all of the techniques described below in connection with any of FIGS. 3-7, e.g., by executing program instructions stored on a memory medium (e.g., a non-transitory computer-readable memory medium) and/or through hardware or firmware operation. In other embodiments, the techniques described below in connection with any of FIGS. 3-7 may be at least partially implemented by a programmable hardware element, such as an field programmable gate array (FPGA), and/or an application specific integrated circuit (ASIC).

In certain aspects, radio 230 may include separate controllers configured to control communications for various respective radio access technology (RAT) protocols. For example, as shown in FIG. 2, radio 230 may include a WLAN controller 250 configured to control WLAN communications, a short-range communication controller 252 configured to control short-range communications, and a WWAN controller 256 configured to control WWAN communications. In certain aspects, the wireless device 200 may store and execute a WLAN software driver for controlling WLAN operations performed by the WLAN controller 250, a short-range communication software driver for controlling short-range communication operations performed by the short-range communication controller 252, and/or a WWAN software driver for controlling WWAN operations performed by the WWAN controller 256.

In certain implementations, a first coexistence interface 254 (e.g., a wired interface) may be used for sending information between the WLAN controller 250 and the short-range communication controller 252. In certain other implementations, a second coexistence interface 258 may be used for sending information between the WLAN controller 250 and the WWAN controller 256. In certain other implementations, a third coexistence interface 260 may be used for sending information between the short-range communication controller 252 and the WWAN controller 256.

In some aspects, one or more of the WLAN controller 250, the short-range communication controller 252, and/or the WWAN controller 256 may be implemented as hardware, software, firmware or some combination thereof.

In certain configurations, the WLAN controller 250 may be configured to communicate with a second device (e.g., central device, transmitting device, etc.) in a WPAN using a WLAN link using all of the antennas 235a, 235b, 235c, 235d. In certain other configurations, the short-range communication controller 252 may be configured to communicate with at least one second device in a WPAN using one or more of the antennas 235a, 235b, 235c, 235d. In certain other configurations, the WWAN controller 256 may be configured to communicate with a second device in a WWAN using all of the antennas 235a, 235b, 235c, 235d. The short-range communication controller 252 may be configured to output a signal received from a central device such that sound source localization may be determined by a user of the peripheral device.

Sound source localization is a person's ability to identify the location or origin of a detected sound. Binaural hearing (e.g., hearing with two ears) enables a person to determine sound source localization by detecting differences in the sound wave's time of arrival and intensity at the left ear versus the right ear, as described below in connection with FIG. 3.

Figure 3:
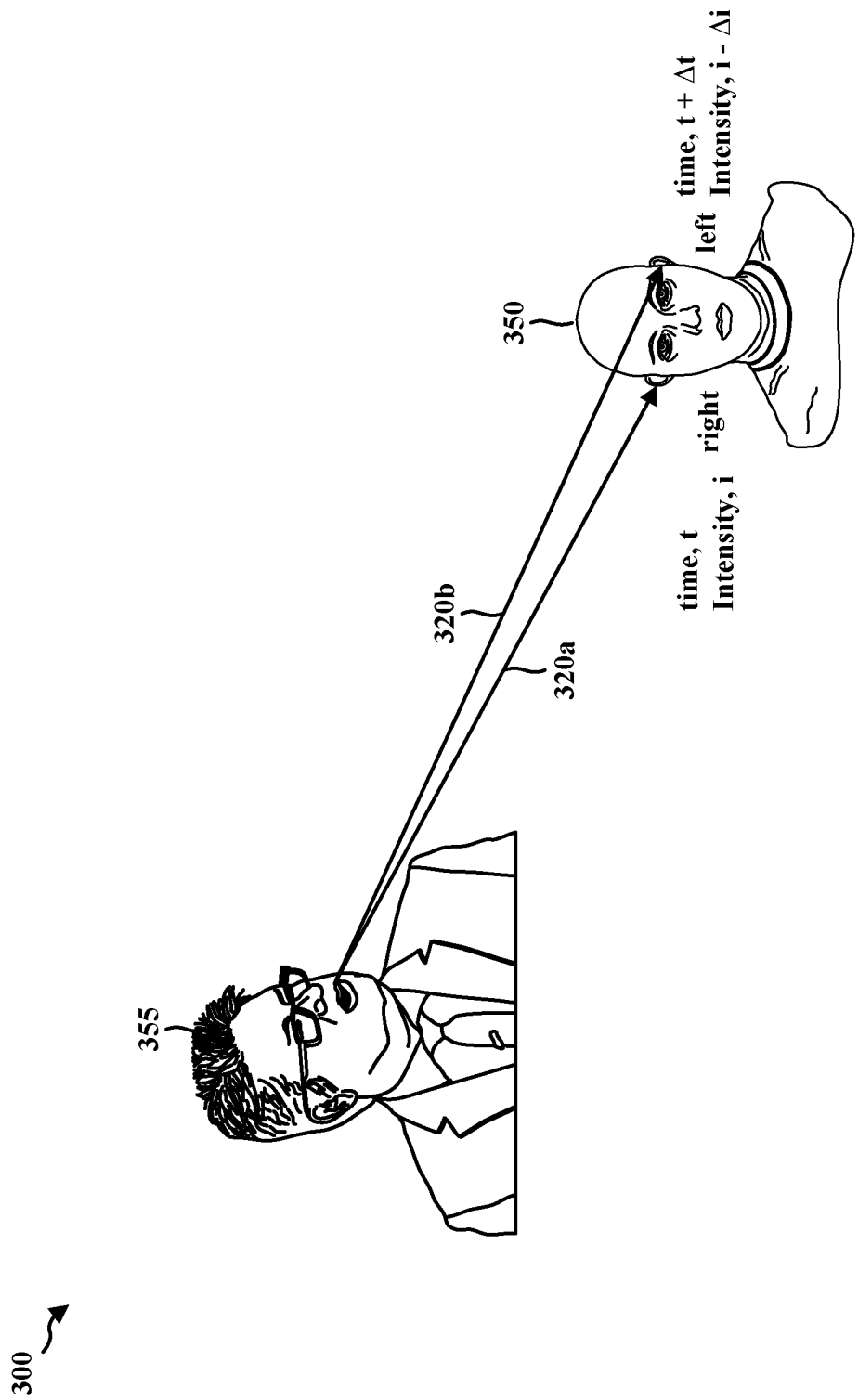
FIG. 3 is a diagram illustrating how binaural hearing may enable a first person to determine sound source localization for sound waves that are received from a sound source located at a particular side of the person.

FIG. 3 is a diagram 300 illustrating how binaural hearing may enable a first person 350 to determine sound source localization for sound waves 320a, 320b that are received from a sound source.

As seen in FIG. 3, the sound source is a second person 355 that is located to the right of the first person 350. The second person 355 is talking, which produces sound waves 320a, 320b that may be respectively received by the right ear and the left ear of the first person 350.

The first sound wave 320a may be received by the right ear at time t and with intensity i. Because the left ear of the first person 350 is located farther from the sound source (e.g., the second person 355), the second sound wave 320b is received at time t+Δt and at an intensity i−Δi, where Δt and Δi are greater than zero. In other words, the left ear of the first person 350 receives the second sound wave 320b at a later time and with a reduced intensity relative to the first sound wave 320a that is received by the first person's right ear.

Through the mechanisms of compression and rarefaction, the sound waves 320a, 320b travel through the air, bounce off the respective pinna and concha of the exterior of the left ear and the right ear, and enter the respective ear canals of the left ear and the right ear. The sound waves 320a, 320b vibrate the tympanic membrane (ear drum) of the left ear and the right ear, causing the three bones of the middle ear located at the right ear and the three bones of the middle ear located at the left ear to vibrate. The vibrations of the middle ear then sends the energy through the oval window and into the cochlea where the energy is changed into a chemical signal by hair cells in the organ of corti. The chemical signals may synapse onto spiral ganglion fibers that travel through the cochlear nerve into the brain.

The difference in time and strength of the chemical signals emanating from the organ of corti in right ear versus the chemical signals emanating from the organ of corti in the left ear may enable the first person 350 to determine and/or perceive sound source localization of the sound waves 320a, 320b, and hence, the second person's 355 relative location with respect to the first person 350.

In certain scenarios, enabling a wireless device to output an audio signal in a way that allows the user to determine and/or perceive the location of an audio source/transmitting device may be beneficial.

In a first example scenario, a user may be playing an augmented reality game while wearing wireless headphones that receive signals from a game system and/or from other players. When the received audio signals are output in such a way that the user can perceive a location of the audio source (e.g., the other player and/or other avatars associated with the game), the user experience may be more immersive, and hence, the user experience may be enhanced (e.g., as compared to a game in which the perception of an audio source's location is not triggered).

In a second example scenario, a person with visual impairment may walk down the street while wearing wireless headphones. As the person approaches a crosswalk, the wireless headphone may come within range of an automated safety broadcast system. The automated safety broadcast system may send audio signals alerting the individual of an approaching cross walk. Once in range, the wireless headphones may receive the audio signals, and output the signals to alert the user of the approaching cross walk. When the received audio signals are output in a way that mimics the direction and intensity of a safety broadcast emanating from the crosswalk and heard at the individual's current position, the individual may be able to gauge the distance to the cross walk.

In a third example scenario, during an emergency situation such as a fire, an emergency broadcast system may send an audio signal alerting individuals wearing wireless headphones of the fire. When certain exits are inaccessible due to smoke and/or fire, the audio signals can be output in such a way as to indicate the location of a safe exit. For example, the audio output may state "Please exit the building." When the audio signals indicate the location of a safe exit, the wireless headphones may output the audio signal in a way that mimics the direction and intensity of an emergency broadcast emanating from the safe exit and heard at the individual's current position. Hence, the individual may be able to gauge the direction and/or distance to a safe exit.

In a fourth example scenario, vehicular communication systems may enable the communication of audio signals between two or more vehicles that are within a short-range communication range of one another. For example, when a driver presses the center of the steering wheel, the driver's vehicle may transmit an audio signal that may be received by any surrounding vehicles within range. Based on a relative position with respect to the transmitting vehicle, a receiving vehicle may output the audio signal in such as a way as to trigger the driver's ability to determine the position and/or distance of the transmitting vehicle based on sound source localization. Hence, the safety feature of alerting other vehicles may be supported without creating ambient noise pollution outside of the vehicles.

Thus, there is a need to enable a wireless device to output audio packets such that the user may determine sound source localization.

The present disclosure provides a solution by enabling a wireless device to determine a time delay and intensity difference associated with an audio output at a subset output devices at the wireless device based at least in part on a perceived spatial placement of at least one signal, a position of the transmitting device, and/or a signal strength associated with the signal.

Using the time delay and the intensity difference, the output devices farthest from the transmitting device may output the at least one signal using the time delay and the intensity difference such that the user may detecting differences in the sound wave's time of arrival and intensity at the left ear versus the right ear, and thus, perceive the location of the transmitting device and/or audio source, e.g., as described below in connection with any of FIGS. 4A-7.

Figure 4A:
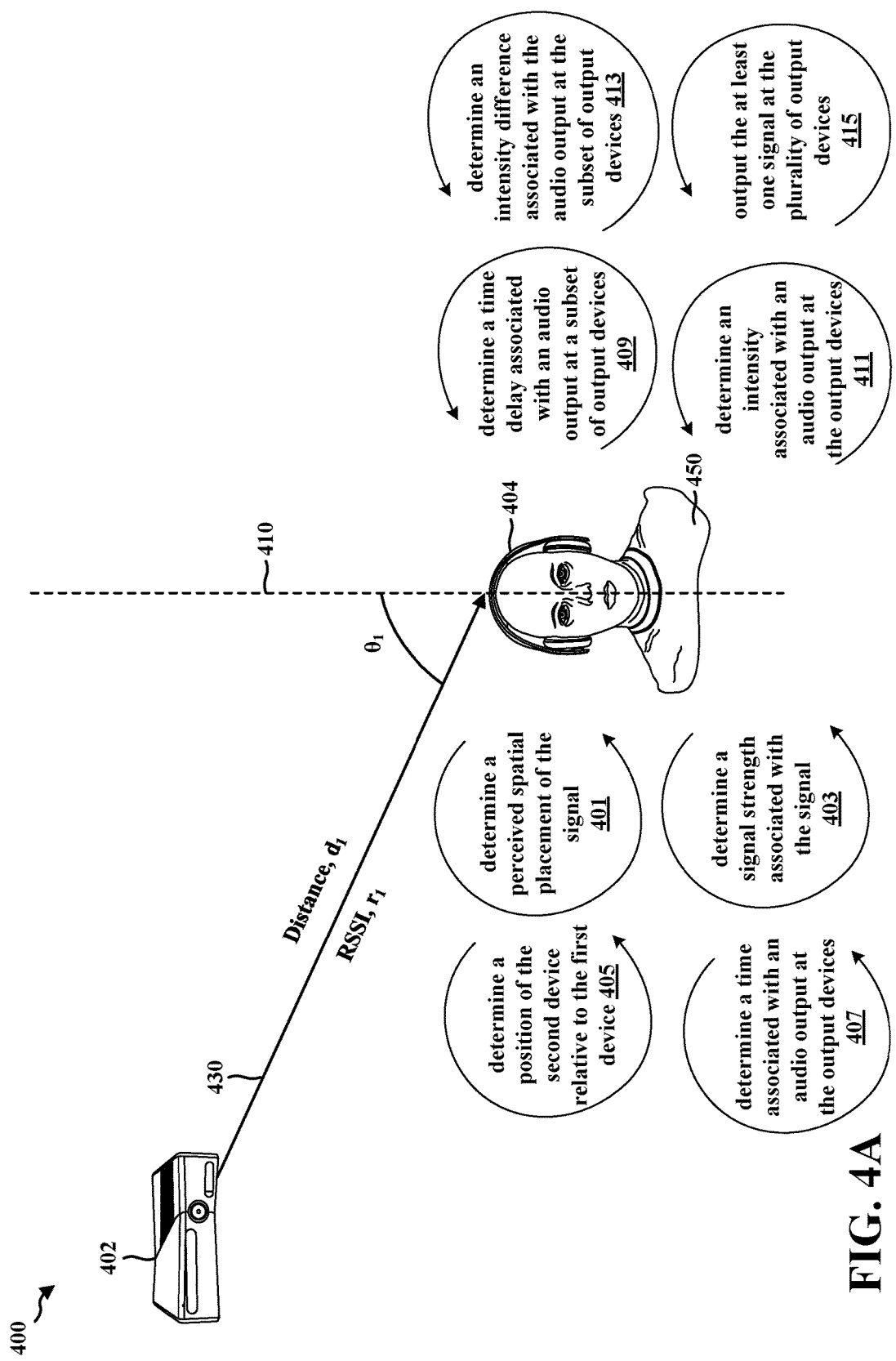
FIG. 4A is a diagram illustrating a technique used to output a signal at a wireless device that may trigger a user's instincts to determine sound source localization in accordance with certain aspects of the disclosure.

FIG. 4A is a diagram 400 illustrating a technique used to output a signal at a wireless device 404 that may trigger a user's instincts to perform sound source localization in accordance with certain aspects of the disclosure. For example, the wireless device 404 may receive the signal 430 from a transmitting device 402. The transmitting device 402 may correspond to, e.g., the central device 102, the second device 650. The wireless device 404 may correspond to, e.g., the peripheral device 104, 106, 108, 110, 112, 114a, 114b, the wireless device 200, the apparatus 602/602'. For illustrative purposes, the transmitting device 402 is depicted as a game system in FIG. 4A. However, the transmitting device 402 is not limited to a game system. For example, the transmitting device 402 may include an emergency broadcast system, a short-range communication enabled vehicle, a safety broadcast system, etc. The wireless device 404 may include a plurality of output devices such as at least one left earphone speaker and at least one right earphone speaker.

Referring to FIG. 4A, the wireless device 404 may receive a signal 430 from the transmitting device 402. The signal 430 may include an audio signal, a control signal, a data signal, etc. The signal 430 may be related to an audio output for an augmented reality game, a virtual reality game, an emergency broadcast announcement, a safety broadcast announcement, a vehicular communication, etc. In certain configurations, the signal 430 may include more than one signal.

In certain configurations, the wireless device 404 may determine (at 401) a perceived spatial placement of the signal 430 with respect to one or more of the wireless device 404 (e.g., AoA=$\theta_1$ based on the first reference point 410) or the transmitting device 402 (e.g., AoD based on a second reference point associated with the transmitting device). In certain aspects, the wireless device 404 may determine (at 401) the AoA based on the signal phase that is received at each antenna (e.g., antenna 235a, 235b, 235c, 235d in FIG. 2) in the wireless device's 404 antenna array. The phase differences between each antenna may be converted to an AoA measurement by the wireless device 404.

Consider, for example, an antenna array with two antennas spaced apart by one-half the wavelength of the signal 430 (e.g., an RF wave). If the RF wave is incident upon the antenna array at boresight, the signal 430 may arrive at each antenna concurrently, thus yielding a 0° phase-difference that is measured between the two antennas. A 0° phase-difference may be equivalent $\theta_1$=0° (see FIG. 4C). If the RF wave is incident upon the antenna array at broadside, then a 180° phase difference between the antennas in the antenna array may be determined that corresponds to $\theta_1$=90°.

In certain configurations, the wireless device 404 may determine the AoA and/or AoD from a look-up table that includes a correlation of the determined phase differences between the antennas and the AoA/AoD of the signal 430. The look-up table may be maintained at the wireless device 404 or remote from the wireless device 404.

In certain other configurations, the wireless device 404 may determine (at 403) a signal strength $r_1$ (e.g., an RSSI) associated with the signal 430. In certain aspects, the RSSI of the signal 430 may be determined based on the power of the signal 430 that is detected by the wireless device 404. Although the RSSI may not be used to determine the distance between the transmitting device 402 and the wireless device 404 within an accuracy threshold, the RSSI may be used to indicate that the user 450 is moving toward or away from the transmitting device 402, e.g., moving toward the transmitting device when intensity increases or moving away from the transmitting device when the intensity decreases in audio playback.

In certain other configurations, the wireless device 404 may determine (at 405) a position of the transmitting device 402 (relative to the wireless device 404) based at least in part on a first reference point 410 (e.g., center line) associated the wireless device 404. For example, based at least in part on the perceived spatial placement (e.g., AoA=$\theta_1$) of the transmitting device 402, the wireless device 404 may determine (at 405) whether the transmitting device 402 is positioned to the left (e.g., 0°<$\theta_1$<) 180° or to the right (e.g., −180°<$\theta_1$<0°) of the first reference point 410 associated with the wireless device 404. If the transmitting device 402 is located to the right of the first reference point 410 as in FIG. 4A, the wireless device may manipulate the audio output at the left earphone speaker(s), as described in further detail below in connection with operation 415.

In certain configurations, the wireless device 404 may determine (at 407) a time t at which the audio is output based at least in part on the time the signal 430 is received. For example, time t may be a predetermined time after the signal 430 is received. When $\theta_1$ is equal to 0°, 180°, or −180°, audio may be output at both the right earphone speaker(s) and the left earphone speaker(s) at time t.

In certain other configurations, the wireless device 404 may determine (at 409) a time delay $\Delta t$ associated with an audio output at a subset of the plurality of output devices (e.g., the left earphone speaker(s)) based at least in part on the perceived spatial placement of the signal 430. For example, the subset of the plurality of output devices may be the output devices that are located on the opposite side of the first reference point 410 as compared to the transmitting device 402. In certain aspects, wireless device 404 may access a look-up table to determine the time delay that is correlated with the perceived spatial relationship $\theta_1$ (e.g., determined at 401) of the signal 430.

In the example illustrated in FIG. 4A, the subset of the plurality of output devices may include the left earphone speaker(s). In other words, the audio output at the right earphone speaker(s) may occur at time=t, and the audio output at the left earphone speaker(s) may occur at time=t+$\Delta t$, where $\Delta t$=fn($\theta_1$). Latency of audio output at the left earphone speaker(s) (e.g., as compared to the right earphone speaker(s)) may be induced using the value of $\Delta t$. When the sound source is located to the user's left, the sound should arrive at the left ear earlier the right ear. Assuming a person's ears are 30 cm apart from one another, and that sound travels at 343 m/s, $\Delta t$ may range from 0 to 1 ms depending on ambient conditions. When $\theta_1$ ranges from 0° to 90°, the wireless device may determine that the time delay $\Delta t$ would be also range from 0 ms to 1 ms at the left output device. When $\theta_1$ ranges from 90° to 180°, the wireless device 404 may determine the time delay $\Delta t$ may range from 1 ms to 0 ms at the right output device.

In certain other configurations, the wireless device 404 may determine (at 411) the intensity $i_1$ with which to use for audio output based on the determined signal strength $r_1$ (e.g., determined at 403). In other words, as the RSSI varies between received signals, the wireless device 404 may increase or decrease the intensity of audio output accordingly based on $i_1$=fn($r_1$).

In certain other configurations, the wireless device 404 may determine (at 413) an intensity difference $\Delta i_1$ associated with the audio output at the subset of the plurality of output devices based at least in part on the position of the transmitting device 402 (e.g., determined at 405), the perceived spatial placement $\theta 1$ (e.g., determined at 401), and/or the signal strength $r_1$ (e.g., determined at 403) associated with the signal 430.

In the example illustrated in FIG. 4A, the subset of the plurality of output devices may include the left earphone speaker(s). For example, wireless device 404 may access a look-up table to determine the first intensity difference that is correlated with one or more of the position of the transmitting device 402 (e.g., determined at 405), the perceived spatial placement $\theta_1$ (e.g., determined at 401), and/or the signal strength $r_1$ (e.g., determined at 403) associated with the signal 430. In other words, the signal may be output at the right earphone speaker(s) with an intensity of $i_1$, and the signal may be output at the left earphone speaker(s) with an intensity of $i_1-\Delta i_1$, where $\Delta i_1$=fn($\theta_1$).

In certain configurations, the wireless device 404 may output (at 415) audio at the plurality of output devices (e.g., the left earphone speaker(s) and the right earphone speaker(s)). In one aspect, the audio may be output at the subset of the plurality of output devices (e.g., the left earphone speaker(s)) based at least in part on the first time delay $\Delta t_1$ and the first intensity difference $\Delta i_1$ determined from the look-up table(s). As described above, the time and intensity at which the audio is output (at 415) at the right earphone speaker(s) may be equal to $t_1$ and $i_1$, respectively, and the time and intensity at which the signal is output (at 415) at the left earphone speaker(s) may be $t_1+\Delta t_1$ and $i_1-\Delta i_1$, respectively. In certain aspects, the audio may be associated with the at least one signal (e.g., when the at least one signal includes an audio packet). In certain other aspects, the audio may not be associated with the at least one signal (e.g., when the at least one signal is not related to an audio output).

Using the technique(s) described above with respect to FIG. 4A, the natural instincts of the user 450 may be triggered, and the user 450 may be able to perceive that the sound source of the signal is located to the right.

Figure 4B:
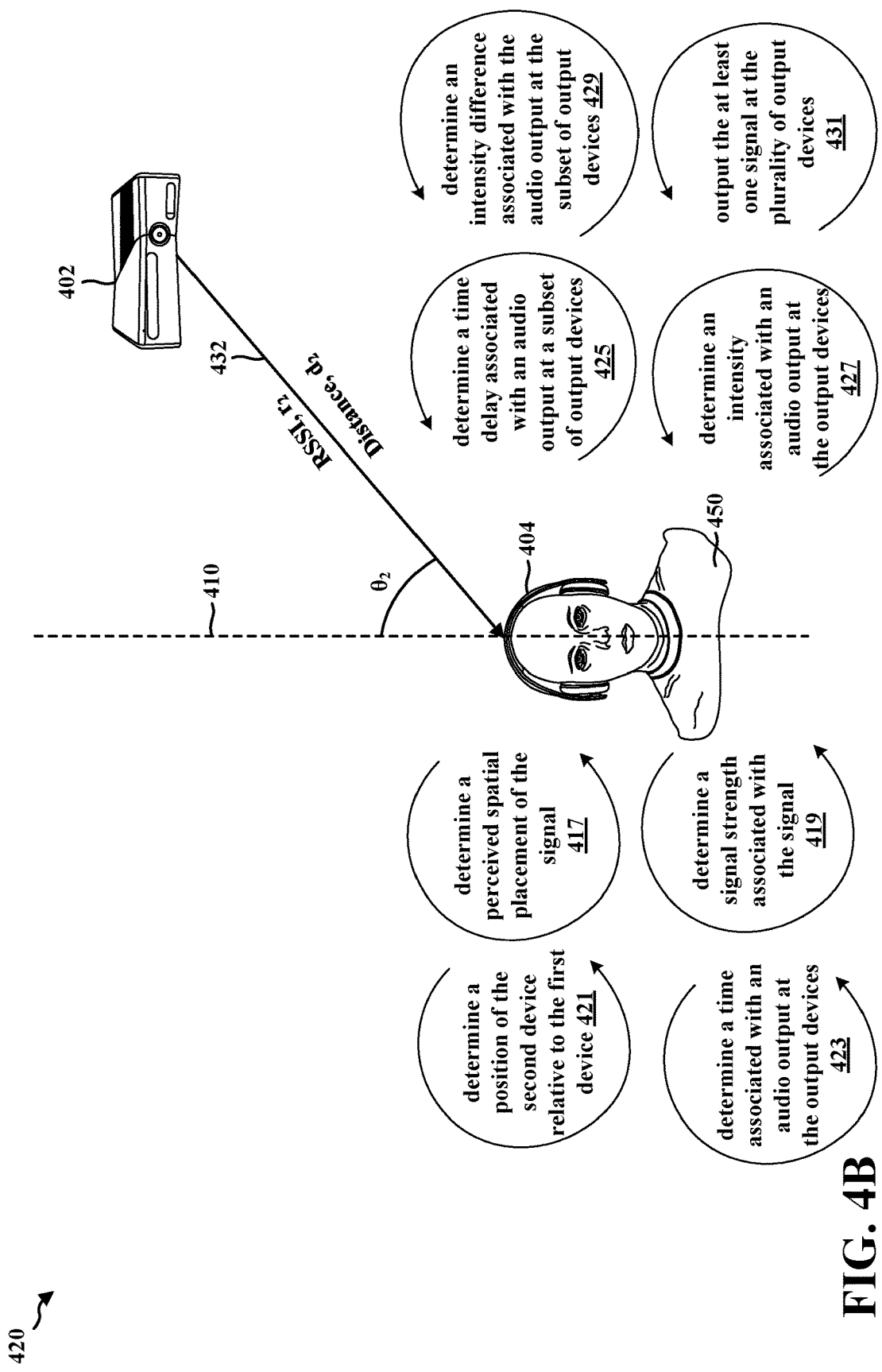
FIG. 4B is a diagram illustrating a technique used to output a signal at a wireless device that may trigger a user's instincts to perform sound source localization in accordance with certain aspects of the disclosure.

FIG. 4B is a diagram 420 illustrating a technique used to output a signal at a wireless device 404 that may trigger a user's instincts to perform sound source localization in accordance with certain aspects of the disclosure. For example, the wireless device 404 may receive the signal 432 from a transmitting device 402. The transmitting device 402 may correspond to, e.g., the central device 102, the second device 650. The wireless device 404 may correspond to, e.g., the peripheral device 104, 106, 108, 110, 112, 114a, 114b, the wireless device 200, the apparatus 602/602'. For illustrative purposes, the transmitting device 402 is depicted as a game system in FIG. 4B. However, the transmitting device 402 is not limited to a game system. For example, the transmitting device 402 may include an emergency broadcast system, a short-range communication enabled vehicle, a safety broadcast system, etc. The wireless device 404 may include a plurality of output devices such as at least one left earphone speaker and at least one right earphone speaker.

Referring to FIG. 4B, the wireless device 404 may receive a signal 432 from the transmitting device 402. The signal 432 may include an audio signal, a control signal, a data signal, etc. The signal 432 may be related to an audio output for an augmented related game, a virtual reality game, an emergency broadcast, a safety broadcast, a vehicular communication, etc. In certain configurations, the signal 432 may include more than one signal.

In certain configurations, the wireless device 404 may determine (at 417) a perceived spatial placement of the signal 432 with respect to one or more of the wireless device 404 (e.g., AoA=$\theta_2$) or the transmitting device 402 (e.g., AoD). In certain aspects, the wireless device 404 may determine (at 417) the AoA by determining the difference in the signal phase that is received at each antenna (e.g., antenna 235a, 235b, 235c, 235d in FIG. 2) in the wireless device's antenna array. The phase differences between each antenna may be converted to an AoA measurement by the wireless device 404.

In certain configurations, the wireless device 404 may determine the AoA and/or AoD from a look-up table that includes a correlation between phase differences at the antennas and AoA/AoD of the signal 432. The look-up table may be maintained at the wireless device 404 or remote from the wireless device 404.

In certain other configurations, the wireless device 404 may determine (at 419) a signal strength $r_2$ (e.g., an RSSI) associated with the signal 432. For example, the RSSI of the signal 432 may be determined based on the power of the received signal 432 that is detected by the wireless device 404.

In certain other configurations, the wireless device 404 may determine (at 421) a position of the transmitting device 402 (relative to the wireless device 404) based at least in part on a first reference point 410 associated the wireless device 404. For example, based at least in part on the perceived spatial placement (e.g., AoA=$\theta_2$) of the transmitting device 402, the wireless device 404 may determine (at 421) whether the transmitting device 402 is positioned to the left (e.g., 0°<$\theta_2$<180°) or to the right (e.g., −180°<$\theta_2$<0°) of the first reference point 410 associated with the wireless device 404.

If the transmitting device 402 is located to the left of the first reference point 410 as in FIG. 4B, the wireless device 404 may manipulate the audio output at the right earphone speaker(s), as described in further detail below in connection with operation 431.

In certain configurations, the wireless device 404 may determine (at 423) a time t at which to output audio based at least in part on the time the signal 432 is received. For example, time t may be a predetermined time after the signal 432 is received.

In certain other configurations, the wireless device 404 may determine (at 425) a time delay $\Delta t_2$ associated with an audio output at a subset of the plurality of output devices (e.g., the left earphone speaker(s)) based at least in part on the perceived spatial placement $\theta_2$ of the signal 432. For example, wireless device 404 may access a look-up table to determine the second time delay $\Delta t_2$ that is correlated with the perceived spatial relationship $\theta_2$ (e.g., determined at 417) of the signal 432.

In the example illustrated in FIG. 4B, the subset of the plurality of output devices may include the right earphone speaker(s). In other words, the audio output at the left earphone speaker(s) may occur at time=t, and the audio output at the right earphone speaker(s) may occur at time=t+$\Delta t_2$, where $\Delta t_2$=fn($\theta_2$). Latency of audio output at the right earphone speaker(s) (e.g., as compared to the left earphone speaker(s)) may be induced using the value of $\Delta t_2$ because right ear is farther away from the sound source.

In certain other configurations, the wireless device 404 may determine (at 427) the intensity $i_2$ with which to output audio based on the determine signal strength (e.g., determined at 419). In other words, as the RSSI varies between received signals, the wireless device 404 may increase or decrease the intensity of audio output accordingly based on $i_2$=fn($r_2$).

Consider the example, where $r_2$ of signal 432 is greater than $r_1$ of signal 430 from FIG. 4A, and that as r increases i increases. Here, $i_2$ is greater than $i_1$. In other words, the intensity or loudness used to output audio in FIG. 4B is greater than the intensity or loudness used to output audio in FIG. 4A. The increase in intensity from $i_1$ to $i_2$ may indicate to the user 450 that he/she is approaching the audio source (e.g., transmitting device 402) when the user 450 moves from the user location in FIG. 4A to the user location in FIG. 4B.

In certain other configurations, the wireless device 404 may determine (at 429) an intensity difference $\Delta i_2$ associated with the audio output at the subset of the plurality of output devices based at least in part on one or more of the position of the transmitting device 402 (e.g., determined at 421), the perceived spatial placement $\theta_2$ (e.g., determined at 417), or the signal strength $r_2$ (e.g., determined at 419) associated with the signal 432. In the example illustrated in FIG. 4B, the subset of the plurality of output devices may include the right earphone speaker(s).

In certain configurations, wireless device 404 may access a look-up table to determine the intensity difference that is correlated with the position of the transmitting device 402 (e.g., determined at 421), the perceived spatial relationship $\theta_2$ (e.g., determined at 417), and/or the signal strength $r_2$ (e.g., determined at 419). In other words, the signal may be output may at the left earphone speaker(s) with the intensity $i_2$, and the signal may be output at the right earphone speaker(s) with the intensity $i_2-\Delta i_2$, where $\Delta i_2$=fn($\theta_2$).

In certain configurations, the wireless device 404 may output (at 431) the audio at the plurality of output devices (e.g., the left earphone speaker(s) and the right earphone speaker(s)). As described above, the time and intensity at which the audio is output (at 431) at the left earphone speaker(s) may be equal to t and $i_2$, respectively, and the time and intensity at which the signal is output (at 431) at the right earphone speaker(s) may be t+$\Delta t_2$ and $i_2$-$\Delta i_2$, respectively. In certain aspects, the audio may be associated with the at least one signal (e.g., when the at least one signal includes an audio packet). In certain other aspects, the audio may not be associated with the at least one signal (e.g., when the at least one signal is not related to an audio output), e.g., when the signal 432 is associated with an augmented reality image.

Using the technique(s) described above with respect to FIG. 4B, the natural instincts of the user 450 may be triggered, and the user 450 may be able to perceive that the sound source of the signal is located to the left.

Figure 4C:
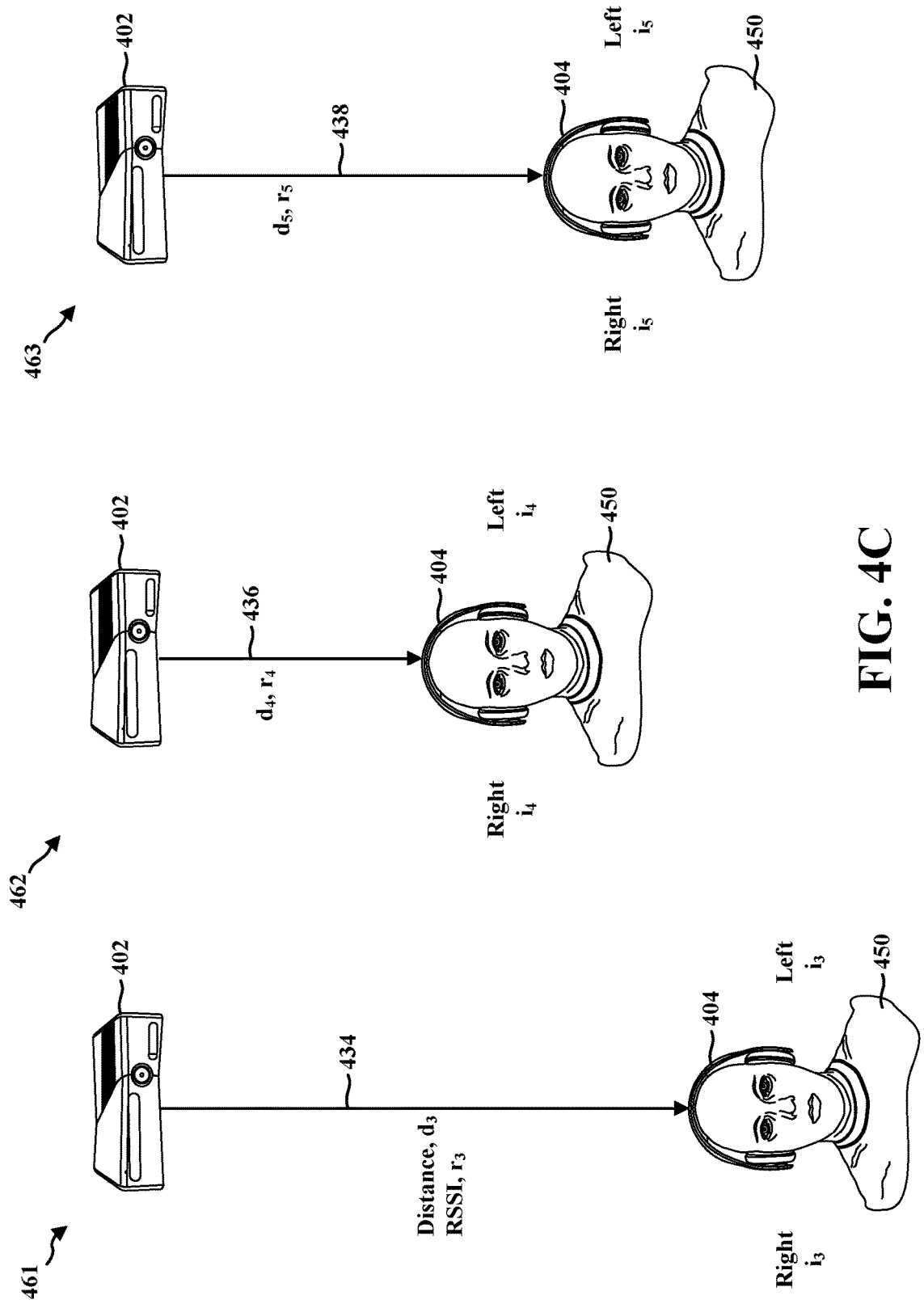
FIG. 4C is a set of diagrams illustrating a technique that may be used to output a signal at a wireless device that may trigger a user's instincts to perceive sound source localization in accordance with certain aspects of the disclosure.

FIG. 4C is a set of diagrams 461, 462, 463 illustrating a technique that may be used to output a signal at a wireless device 404 that may trigger a user's instincts to perceive sound source localization in accordance with certain aspects of the disclosure. For example, the wireless device 404 may receive the signal from a transmitting device 402. The transmitting device 402 may correspond to, e.g., the central device 102, the second device 650. The wireless device 404 may correspond to, e.g., the peripheral device 104, 106, 108, 110, 112, 114a, 114b, the wireless device 200, the apparatus 602/602'. For illustrative purposes, the transmitting device 402 is depicted as a game system in FIG. 4B. However, the transmitting device 402 is not limited to a game system. For example, the transmitting device 402 may include an emergency broadcast system, a short-range communication enable vehicle, a safety broadcast system, etc. The wireless device 404 may include a plurality of output devices such as at least one left earphone speaker and at least one right earphone speaker.

In FIG. 4C, the wireless device 404 may determine that the transmitting device 402 is directly aligned with the first reference point 410 using the techniques described above at operations 401, 417 in connection with FIGS. 4A and 4B, respectively. In other words, θ=0° in diagrams 461, 462, 463 in FIG. 4C.

Referring to diagram 461, the wireless device 404 may determine a signal strength $r_3$ (e.g., an RSSI) associated with the signal 434. For example, the RSSI of the signal 434 may be determined based on the power of the received signal 434 that is detected by the wireless device 404. Further, the wireless device 404 may determine an intensity $i_3$ based on the signal strength $r_3$.

Referring to diagram 462, the wireless device 404 may determine a signal strength $r_4$ (e.g., an RSSI) associated with the signal 436. For example, the RSSI of the signal 436 may be determined based on the power of the received signal 436 that is detected by the wireless device 404. Further, the wireless device 404 may determine an intensity $i_4$ based on the signal strength $r_4$.

Referring to diagram 463, the wireless device 404 may determine a signal strength $r_5$ (e.g., an RSSI) associated with the signal 438. For example, the RSSI of the signal 438 may be determined based on the power of the received signal 438 that is detected by the wireless device 404. Further, the wireless device 404 may determine an intensity $i_5$ based on the signal strength $r_5$.

Consider the example, where $r_3 < r_4 > r_5$, and that as r increases i increases. Here, $i_3 < i_4 > i_5$. In other words, the intensity or loudness used to output audio in diagram 461 is less than the intensity used to output audio in diagram 462. The increase in intensity from $i_3$ to $i_4$ may indicate to the user 450 that he/she is approaching the audio source (e.g., transmitting device 402) when the user 450 moves from the user location in diagram 461 to the user location in diagram 462. Conversely, the decrease in intensity from $i_4$ to $i_5$ may indicate to the user 450 that he/she is moving away from the audio source (e.g., transmitting device 402) when the user 450 moves from the user location in diagram 462 to the user location in diagram 463.

Using the technique(s) described above with respect to FIG. 4C, the natural instincts of the user 450 may be triggered, and the user 450 may be able to perceive that he/she is moving toward or away from the sound source.

Figure 4D:
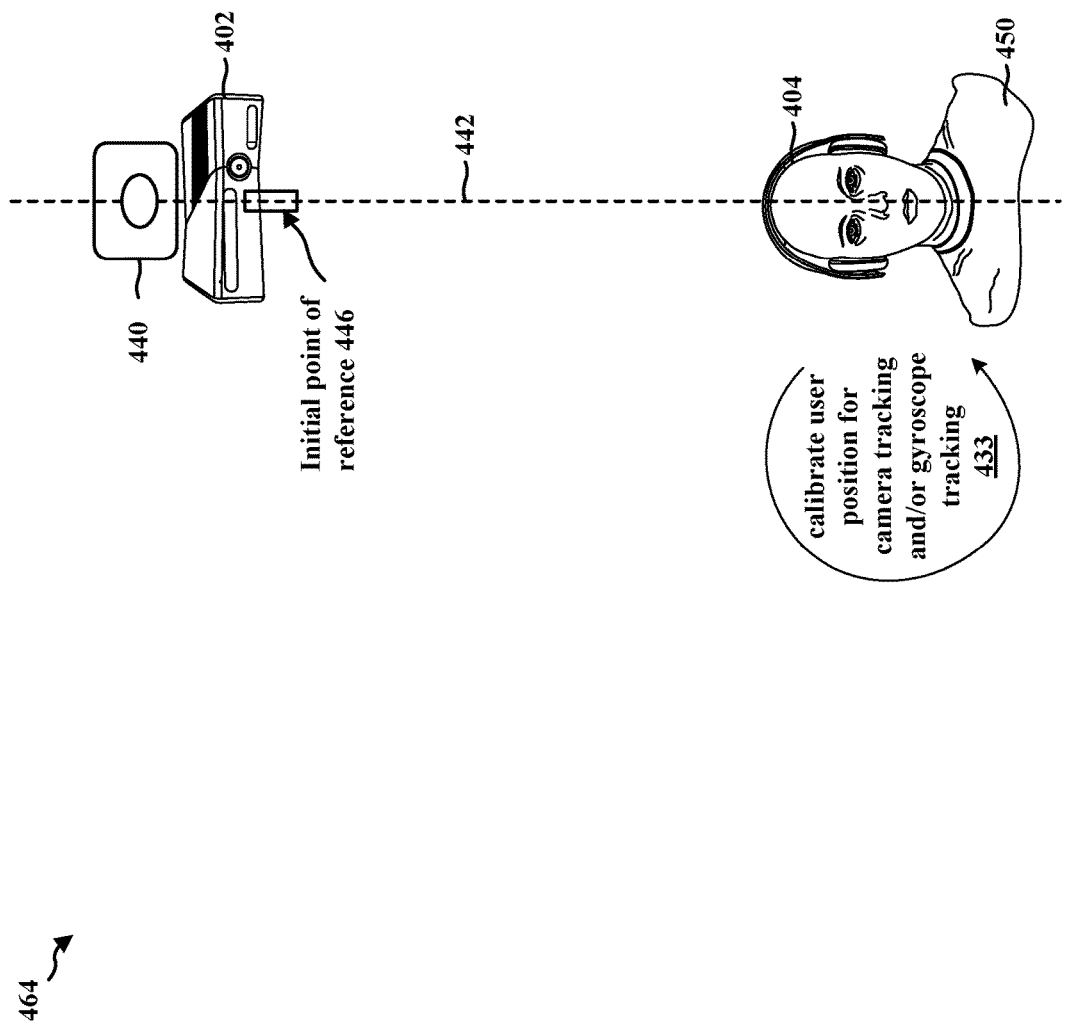
FIG. 4D is a diagram illustrating a technique that may be used to calibrate a camera tracking system and/or a gyroscope tracking system in accordance with certain aspects of the disclosure.

FIG. 4D is a diagram 464 illustrating a technique that may be used to calibrate a camera tracking system and/or a gyroscope tracking system in accordance with certain aspects of the disclosure. For example, the camera tracking system 440 may be associated with a transmitting device 402 and the gyroscope tracking system may be included in the wireless device 404. The transmitting device 402 may correspond to, e.g., the central device 102, the second device 650. The wireless device 404 may correspond to, e.g., the peripheral device 104, 106, 108, 110, 112, 114a, 114b, the wireless device 200, the apparatus 602/602'. For illustrative purposes, the transmitting device 402 is depicted as a game system in FIG. 4B. However, the transmitting device 402 is not limited to a game system. For example, the transmitting device 402 may include an emergency broadcast system, a short-range communication enabled vehicle, a safety broadcast system, etc. Although the camera tracking system 440 is illustrated as positioned on top of the transmitting device 402, the camera tracking system 440 may be positioned in any location that facilitates optical tracking of the user 450. The wireless device 404 may include a plurality of output devices such as at least one left earphone speaker and at least one right earphone speaker.

As seen in FIG. 4D, one or more of the transmitting device 402 and/or the wireless device 404 may perform (at 433) an initial calibration of the camera tracking system and/or gyroscope tracking system. The initial calibration may be performed (at 433) when the user 450 is aligned with a second reference point 442 that is associated with an initial reference point 446 on the transmitting device 402.

When the camera tracking system 440 is used to perform optical tracking of the user 450, the camera tracking system 440 may determine the initial position coordinates (e.g., x-axis coordinates, y-axis coordinates, and z-axis coordinates) associated with the user 450. In certain aspects, the initial position coordinates may be determined based on markers attached to the user 450 (e.g., attached to the wireless device 404, the clothing of the user 450, a game controller used by the user 450, etc.). When the user moves, the camera tracking system 440 may determine a position of the user 450 with respect to the initial position coordinates, and hence, be able to determine the position of the user 450, and a velocity and/or acceleration associated with the user's movement. The x-axis coordinates may be used to determine if the sound source is to the left or to the right of the user's head. The y-axis coordinates may be used to determine if the sound source is in front or behind the user's head. The z-axis coordinates may be used to determine if the sound source is above or below the user's head.

When the gyroscope tracking system is used to perform non-optical tracking of the user 450, the gyroscope tracking system may determine the initial position coordinates (e.g., x-axis coordinates, y-axis coordinates, and z-axis coordinates) of the wireless device 404 with respect to the transmitting device 402. For example, the initial position coordinates may be set as (0, 0, and 0). When the user moves, the gyroscope tracking system may determine a position of the user 450 with respect to the initial position coordinates, and hence, be able to determine the position of the user 450, and a velocity and/or acceleration associated with the user's movement. The x-axis coordinates may be used to determine if the sound source is to the left or to the right of the user's head. The y-axis coordinates may be used to determine if the sound source is in front or behind the user's head. The z-axis coordinates may be used to determine if the sound source is above or below the user's head.

Figure 4E:
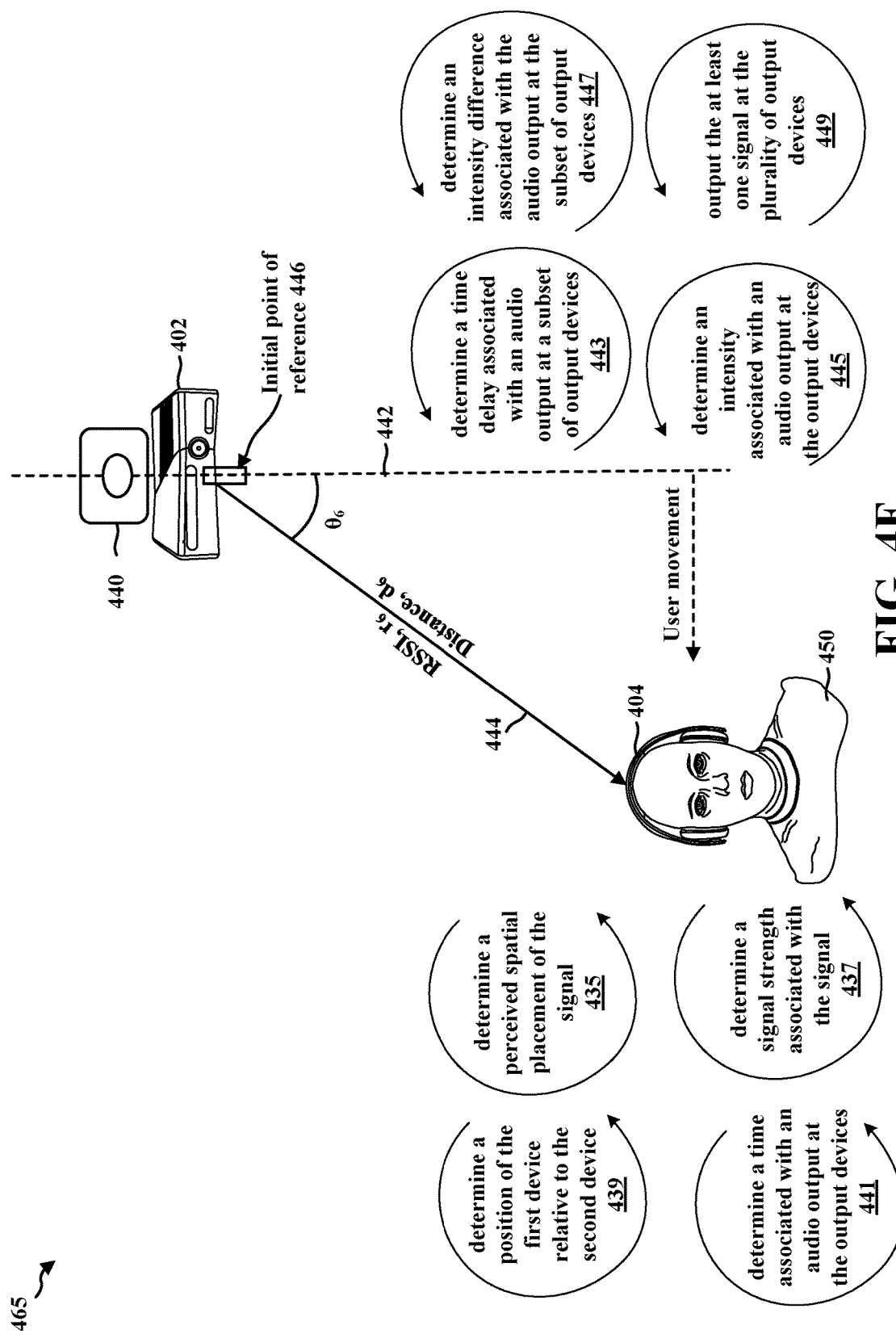
FIG. 4E is a diagram illustrating a technique used to output a signal at a wireless device that may trigger a user's instincts to perform sound source localization in accordance with certain aspects of the disclosure.

FIG. 4E is a diagram 465 illustrating a technique used to output a signal at a wireless device 404 that may trigger a user's instincts to perform sound source localization in accordance with certain aspects of the disclosure. For example, the wireless device 404 may receive the signal 444 from a transmitting device 402. The transmitting device 402 may correspond to, e.g., the central device 102, the second device 650. The wireless device 404 may correspond to, e.g., the peripheral device 104, 106, 108, 110, 112, 114a, 114b, the wireless device 200, the apparatus 602/602'. For illustrative purposes, the transmitting device 402 is depicted as a game system in FIG. 4E. However, the transmitting device 402 is not limited to a game system. For example, the transmitting device 402 may include an emergency broadcast system, a short-range communication enabled vehicle, a safety broadcast system, etc. Although the camera tracking system 440 is illustrated as positioned on top of the transmitting device 402, the camera tracking system 440 may be positioned in any location that facilitates optical tracking of the user 450. The wireless device 404 may include a plurality of output devices such as at least one left earphone speaker and at least one right earphone speaker.

Referring to FIG. 4E, the wireless device 404 may receive a signal 444 from the transmitting device 402. The signal 444 may include an audio signal, a control signal, a data signal, etc. The signal 444 may be related to an audio output for an augmented reality game, a virtual reality game, an emergency broadcast, a safety broadcast, a vehicular communication, etc. In certain configurations, the signal 444 may include more than one signal. When a camera tracking system 440 is used to determine a position of the user 450 with respect to the initial position depicted in FIG. 4D, the signal 444 may include camera tracking information such as user position.

In certain configurations, the wireless device 404 may determine (at 435) a perceived spatial placement of the signal 444 with respect to one or more of the wireless device 404 (e.g., AoA) or the transmitting device 402 (e.g., AoD=$\theta_6$). In certain aspects, the wireless device 404 may determine (at 435) the AoD by determining the difference in the signal phase that is received at each antenna (e.g., antenna 235a, 235b, 235c, 235d in FIG. 2) in the wireless device's antenna array. The phase differences between each antenna may be converted to an AoD measurement by the wireless device 404.

In certain configurations, the wireless device 404 may determine the AoA and/or AoD from a look-up table that includes a correlation between phase differences at the antennas and AoA/AoD of the signal 444. The look-up table may be maintained at the wireless device 404 or remote from the wireless device 404.

In certain other configurations, the wireless device 404 may determine (at 437) a signal strength $r_6$ (e.g., an RSSI) associated with the signal 444. For example, the RSSI of the signal 444 may be determined based on the power of the received signal 444 that is detected by the wireless device 404.

In certain other configurations, the wireless device 404 may determine (at 439) a position of the transmitting device 402 (relative to the wireless device 404) based at least in part on a second reference point 442 associated the wireless device 404. For example, based at least in part on the perceived spatial placement (e.g., AoD=$\theta_6$) of the transmitting device 402, the wireless device 404 may determine (at 439) whether the wireless device 404 is positioned to the left (e.g., 0°>$\theta_6$>−180°) or to the right (e.g., 180°>$\theta_6$>0°) of the second reference point 442 associated with the transmitting device 402.

Additionally and/or alternatively, the wireless device 404 may use position information that is included in the signal 444 to determine the wireless device's position. The position information included in the signal 444 may be relative to the initial coordinates determined by the camera tracking system 440 in FIG. 4D. The position information may be used in isolation or in conjunction with the AoA/AoD (e.g., determined at 435) to determine the wireless device's position. For example, the information associated with the x-axis coordinates may be used to determine if the sound source is to the left or to the right of the user's head, the y-axis coordinates may be used to determine if the sound source is in front or behind the user's head, and/or the z-axis coordinates may be used to determine if the sound source is above or below the user's head.

Still further, the wireless device 404 may use position information that is relative to the gyroscope tracking system's initial coordinates determined in FIG. 4D. The gyroscope position information may be used in isolation, or in conjunction with one or more of the AoA/AoD and any position information determined by the camera tracking system 440 that is included in the signal 444. For example, the information associated with the x-axis coordinates may be used to determine if the sound source is to the left or to the right of the user's head, the y-axis coordinates may be used to determine if the sound source is in front or behind the user's head, and/or the z-axis coordinates may be used to determine if the sound source is above or below the user's head.

When the wireless device 404 is located to the right of the second reference point 442 as in FIG. 4E, the wireless device 404 may manipulate the audio output at the right earphone speaker(s), as described in further detail below in connection with operation 449.

In certain configurations, the wireless device 404 may determine (at 441) a time t at which to output audio based at least in part on the time the signal 444 is received. For example, time t may be a predetermined time after the signal 444 is received.

In certain other configurations, the wireless device 404 may determine (at 443) a time delay $\Delta t_6$ associated with an audio output at a subset of the plurality of output devices (e.g., the right earphone speaker(s)) based at least in part on the perceived spatial placement $\theta_6$ of the signal 444, the position information determined by the camera tracking system 440, and/or the gyroscope tracking device. For example, wireless device 404 may access a look-up table to determine the second time delay $\Delta t_6$ that is correlated with one or more of the perceived spatial placement $\theta_6$ of the signal 444, the position information determined by the camera tracking system 440, and/or the gyroscope tracking device.

In the example illustrated in FIG. 4E, the subset of the plurality of output devices may include the right earphone speaker(s). In other words, the audio output at the left earphone speaker(s) may occur at time=t, and the audio output at the right earphone speaker(s) may occur at time=t+ $\Delta t_6$, where $\Delta t_6 = \text{fn}(\theta_6)$. Latency of audio output at the right earphone speaker(s) (e.g., as compared to the left earphone speaker(s)) may be induced using the value of $\Delta t_6$ because the right ear is farther from the sound source.

In certain other configurations, the wireless device 404 may determine (at 445) the intensity $i_6$ with which to output audio based on the determined signal strength (e.g., determined at 437). In other words, as the RSSI varies between received signals, the wireless device 404 may increase or decrease the intensity of audio output accordingly based on $i_6 = \text{fn}(r_6)$.

In certain other configurations, the wireless device 404 may determine (at 447) an intensity difference $\Delta i_6$ associated with the audio output at the subset of the plurality of output devices based at least in part on one or more of the position of the transmitting device 402 (e.g., determined at 439), the perceived spatial placement θ6 (e.g., determined at 435), or the signal strength $r_6$ (e.g., determined at 437) associated with the signal 444. In the example illustrated in FIG. 4E, the subset of the plurality of output devices may include the right earphone speaker(s).

In certain configurations, wireless device 404 may access a look-up table to determine the intensity difference that is correlated with the position of the transmitting device 402 (e.g., determined at 439), the perceived spatial relationship $\theta_6$ (e.g., determined at 435), and/or the signal strength $r_6$ (e.g., determined at 437). In other words, the signal may be output may at the left earphone speaker(s) with the intensity $i_6$, and the signal may be output at the right earphone speaker(s) with the intensity $i_6 - \Delta i_6$, where $\Delta i_2 = \text{fn}(\Delta_6)$.

In certain configurations, the wireless device 404 may output (at 449) the audio at the plurality of output devices (e.g., the left earphone speaker(s) and the right earphone speaker(s)). As described above, the time and intensity at which the audio is output (at 449) at the left earphone speaker(s) may be equal to t and $i_6$, respectively, and the time and intensity at which the audio is output (at 449) at the right earphone speaker(s) may be t+$\Delta t_6$ and $i_6 - \Delta i_6$, respectively. In certain aspects, the audio may be associated with the at least one signal (e.g., when the at least one signal includes an audio packet). In certain other aspects, the audio may not be associated with the at least one signal (e.g., when the at least one signal is not related to an audio output).

Using the technique(s) described above with respect to FIG. 4E, the natural instincts of the user 450 may be triggered, and the user 450 may be able to perceive that the sound source of the signal is located to the left.

Figure 5A:
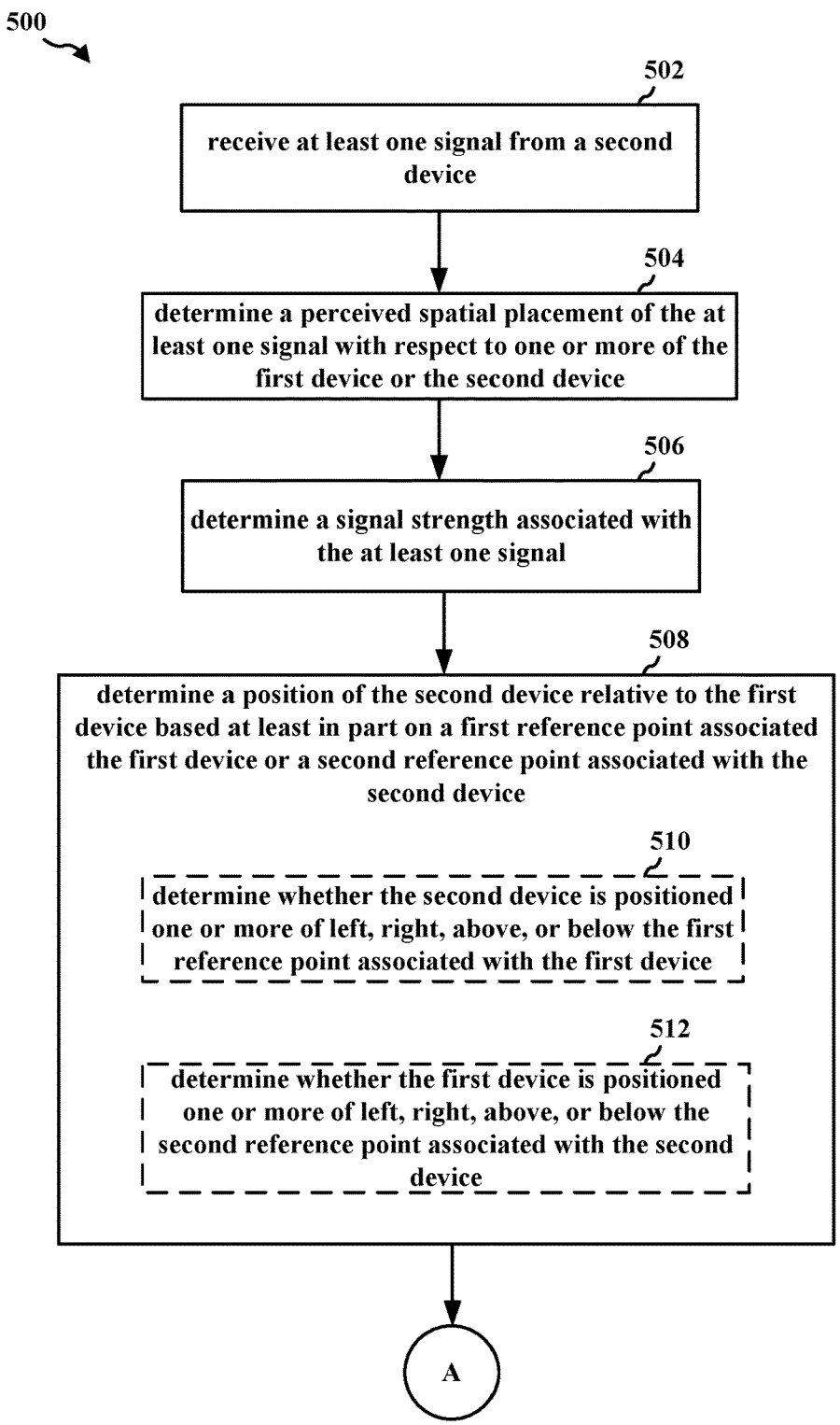
FIGS. 5A-5C are a flowchart of a method of wireless communication.
Figure 5B:
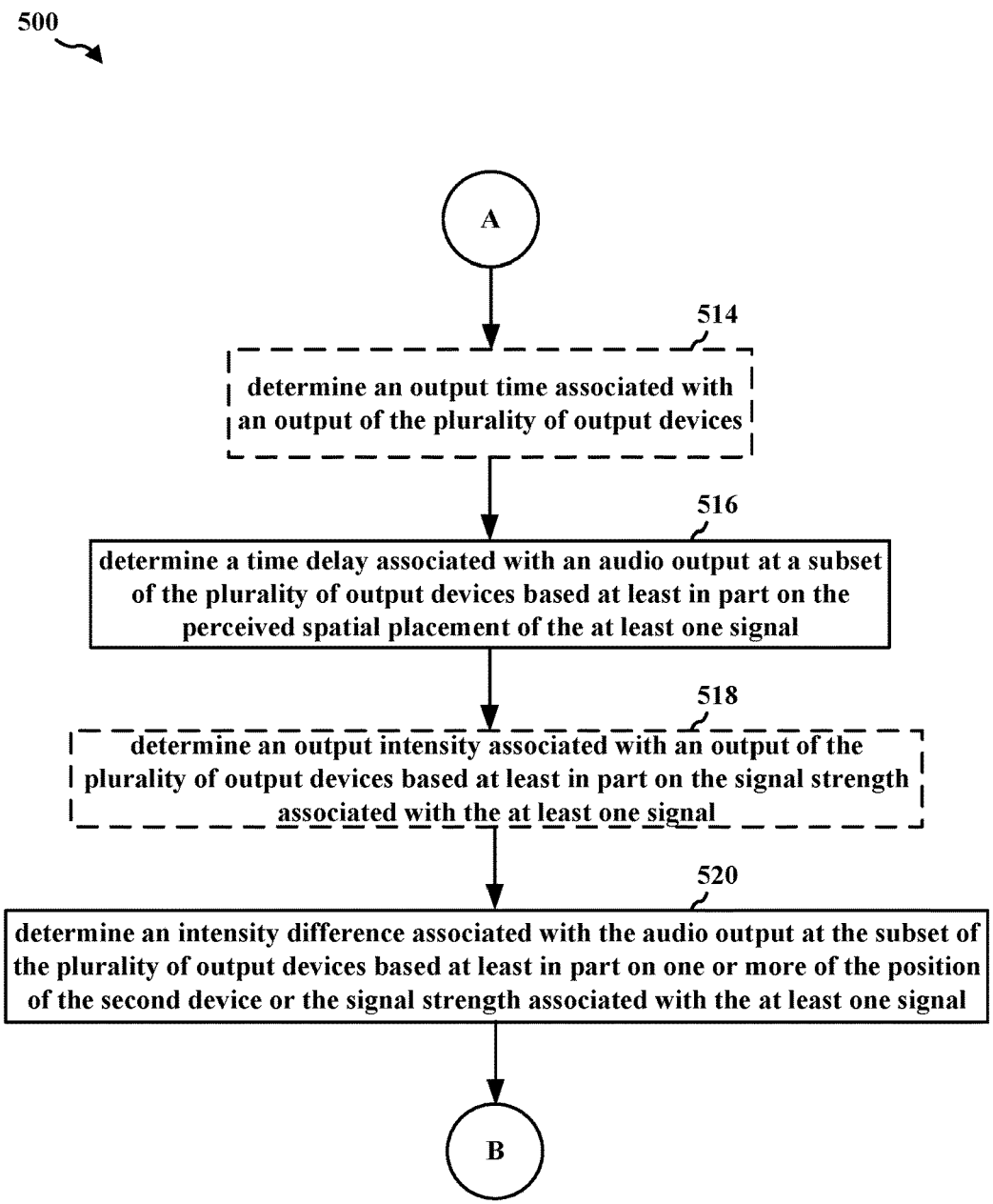
Figure 5C:
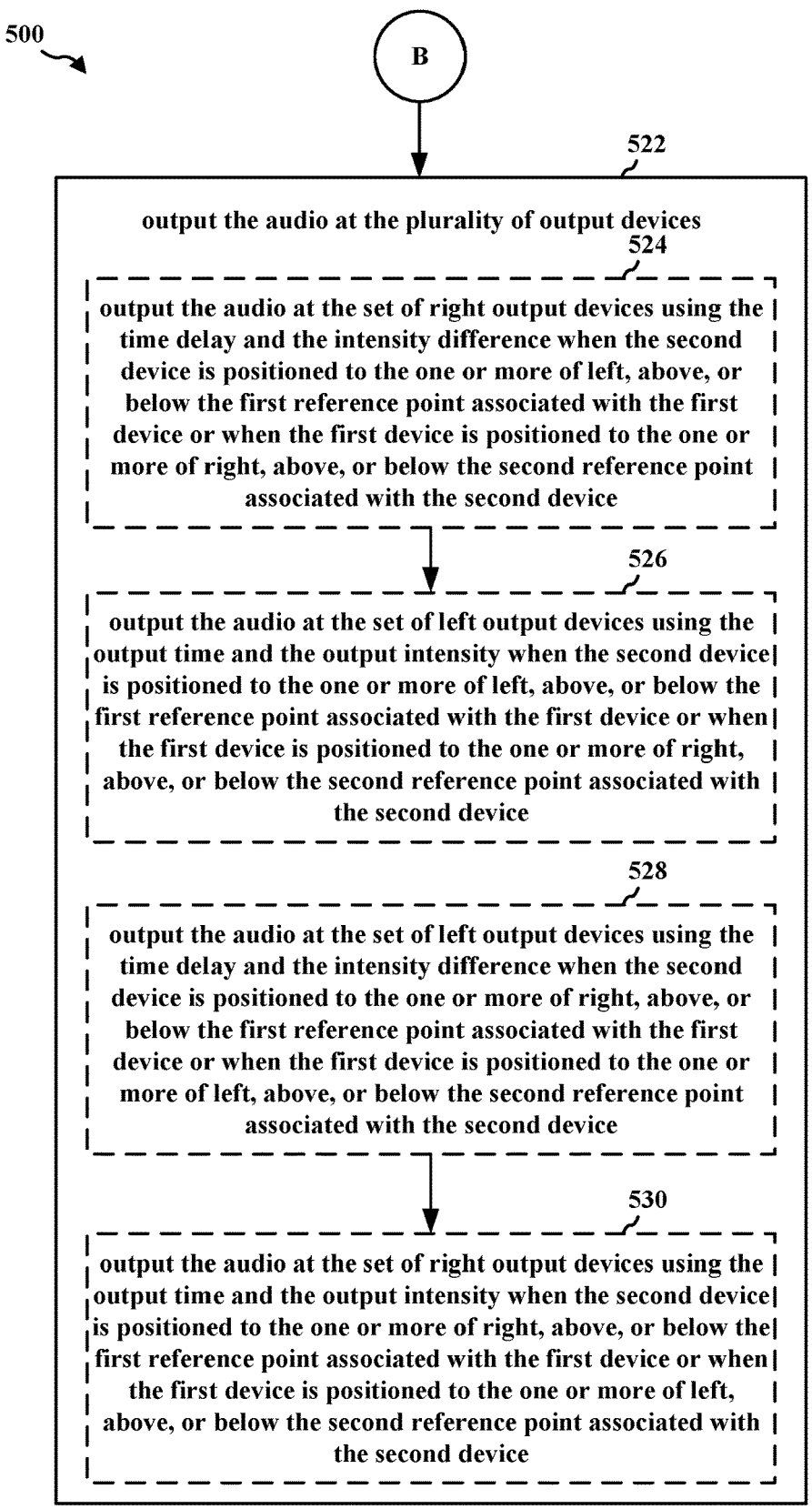

FIGS. 5A-5C are a flowchart 500 of a method of wireless communication. The method may be performed by a wireless device (e.g., the peripheral device 104, 106, 108, 110, 112, 114a, 114b, the wireless device 200, 404, the apparatus 602/602'). In FIGS. 5A-5C, optional operations are indicated with dashed lines.

Referring to FIG. 5A, at 502, the wireless device may receive at least one signal from a second device. In certain configurations, the at least one signal may include information associated with the camera tracking. For example, referring to FIGS. 4A, 4B, 4C, and 4E, the wireless device 404 may receive a signal 430, 432, 434, 436, 438, 444 from a transmitting device 402. The signal 430, 432, 434, 436, 438, 444 may include an audio signal, a control signal, a data signal, etc. The signal 430, 432, 434, 436, 438, 444 may be related to an audio output for an augmented reality game, a virtual reality game, an emergency broadcast announcement, a safety broadcast announcement, a vehicular communication, etc. In certain configurations, the signal 430, 432, 434, 436, 438, 444 may include more than one signal, and the signal 444 may include information associated with camera tracking by the camera tracking system 440.

At 504, the wireless device may determine a perceived spatial placement of the at least one signal with respect to one or more of the first device or the second device. In certain aspects, the perceived spatial placement is associated with one or more of an AoA, an AoD, camera tracking, or a gyroscope measurement. For example, referring to FIG. 4A, the wireless device 404 may determine (at 401) a perceived spatial placement of the signal 430 with respect to one or more of the wireless device 404 (e.g., AoA=$\theta_1$) or the transmitting device 402 (e.g., AoD). In certain aspects, the wireless device 404 may determine (at 401) the AoA based on the signal phase that is received at each antenna (e.g., antenna 235a, 235b, 235c, 235d in FIG. 2) in the wireless device's 404 antenna array. The phase differences between each antenna may be converted to an AoA measurement by the wireless device 404. In certain configurations, the wireless device 404 may determine the AoA and/or AoD from a look-up table that includes a correlation between the determined phase differences between the antennas and the AoA/AoD of the signal 430. The look-up table may be maintained at the wireless device 404 or remote from the wireless device 404. In another example, referring to FIG. 4B, the wireless device 404 may determine (at 417) a perceived spatial placement of the signal 432 with respect to one or more of the wireless device 404 (e.g., AoA=$\theta_2$) or the transmitting device 402 (e.g., AoD). In certain aspects, the wireless device 404 may determine (at 417) the AoA by determining the difference in the signal phase that is received at each antenna (e.g., antenna 235a, 235b, 235c, 235d in FIG. 2) in the wireless device's antenna array. The phase differences between each antenna may be converted to an AoA measurement by the wireless device 404. In another example, referring to FIG. 4E, the wireless device 404 may determine (at 435) a perceived spatial placement of the signal 444 with respect to one or more of the wireless device 404 (e.g., AoA, camera tracking information, gyroscope information, etc.) or the transmitting device 402 (e.g., AoD=$\theta_6$, camera tracking information, gyroscope information, etc.). In certain aspects, the wireless device 404 may determine (at 435) the AoD by determining the difference in the signal phase that is received at each antenna (e.g., antenna 235a, 235b, 235c, 235d in FIG. 2) in the wireless device's antenna array. The phase differences between each antenna may be converted to an AoD measurement by the wireless device 404.

At 506, the wireless device may determine a signal strength associated with the at least one signal. For example, referring to FIG. 4A, the wireless device 404 may determine (at 403) a signal strength $r_1$ (e.g., an RSSI) associated with the signal 430. In certain aspects, the RSSI of the signal 430 may be determined based on the power of the signal 430 that is detected by the wireless device 404. Although the RSSI may not be used to determine the distance between the transmitting device 402 and the wireless device 404 within an accuracy threshold, the RSSI may be used to indicate that the user 450 is moving toward or away from the transmitting device 402, e.g., moving toward the transmitting device when intensity increases or away from the transmitting device when intensity decreases during audio playback. In another example, referring to FIG. 4B, the wireless device 404 may determine (at 419) a signal strength $r_2$ (e.g., an RSSI) associated with the signal 432. For example, the RSSI of the signal 432 may be determined based on the power of the received signal 432 that is detected by the wireless device 404. In another example, referring to FIG. 4E, the wireless device 404 may determine (at 437) a signal strength $r_6$ (e.g., an RSSI) associated with the signal 444. For example, the RSSI of the signal 444 may be determined based on the power of the received signal 444 that is detected by the wireless device 404.

At 508, the wireless device may determine a position of the second device relative to the first device based at least in part on a first reference point associated the first device or a second reference point associated with the second device. In certain aspects, when the position of the second device is determined with respect to the first reference point associated the first device, the position is determined based at least in part on one or more of the AoA or the AoD. In certain other aspects, when the position of the first device is determined with respect to the second reference point associated the second device, the position is determined based at least in part on one or more of the camera tracking or the gyroscope measurement. For example, referring to FIG. 4A, the wireless device 404 may determine (at 405) a position of the transmitting device 402 (relative to the wireless device 404) based at least in part on a first reference point 410 (e.g., center line) associated the wireless device 404. For example, based at least in part on the perceived spatial placement (e.g., AoA=$\theta_1$) of the transmitting device 402, the wireless device 404 may determine (at 405) whether the transmitting device 402 is positioned to the left (e.g., 0°<$\theta_1$<180°) or to the right (e.g., −180°<$\theta_1$<0°) of the first reference point 410 associated with the wireless device 404. In another example, referring to FIG. 4B, the wireless device 404 may determine (at 421) a position of the transmitting device 402 (relative to the wireless device 404) based at least in part on a first reference point 410 associated the wireless device 404. For example, based at least in part on the perceived spatial placement (e.g., AoA=$\theta_2$) of the transmitting device 402, the wireless device 404 may determine (at 421) whether the transmitting device 402 is positioned to the left (e.g., 0°<$\theta_2$<180°) or to the right (e.g., −180°<$\theta_2$<0°) of the first reference point 410 associated with the wireless device 404. In another example, referring to FIG. 4E, the wireless device 404 may determine (at 439) a position of the transmitting device 402 (relative to the wireless device 404) based at least in part on a second reference point 442 associated the wireless device 404. For example, based at least in part on the perceived spatial placement (e.g., AoD=$\theta_6$) of the transmitting device 402, the wireless device 404 may determine (at 439) whether the wireless device 404 is positioned to the left (e.g., 0°>$\theta_6$>−180°) or to the right (e.g., 180°>$\theta_6$>0°) of the second reference point 442 associated with the transmitting device 402.

At 510, the wireless device may determine a position of the second device relative to the first device based at least in part on a first reference point associated the first device or a second reference point associated with the second device by determining whether the second device is positioned one or more of left, right, above, or below the first reference point associated with the first device. For example, referring to FIG. 4A, based at least in part on the perceived spatial placement (e.g., AoA=$\theta_1$) of the transmitting device 402, the wireless device 404 may determine (at 405) whether the transmitting device 402 is positioned to the left (e.g., 0°<$\theta_1$<180°) or to the right (e.g., −180°<$\theta_1$<0°) of the first reference point 410 associated with the wireless device 404.

In another example, referring to FIG. 4B, based at least in part on the perceived spatial placement (e.g., AoA=$\theta_2$) of the transmitting device 402, the wireless device 404 may determine (at 421) whether the transmitting device 402 is positioned to the left (e.g., 0°<$\theta_2$<180°) or to the right (e.g., −180°<$\theta_2$<0°) of the first reference point 410 associated with the wireless device 404.

At 512, the wireless device may determine a position of the second device relative to the first device based at least in part on a first reference point associated the first device or a second reference point associated with the second device by determining whether the first device is positioned one or more of left, right, above, or below the second reference point associated with the second device. For example, referring to FIG. 4E, based at least in part on the perceived spatial placement (e.g., AoD=$\theta_6$) of the transmitting device 402, the wireless device 404 may determine (at 439) whether the wireless device 404 is positioned to the left (e.g., 0°>$\theta_6$>−180°) or to the right (e.g., 180°>$\theta_6$>0°) of the second reference point 442 associated with the transmitting device 402.

Referring to FIG. 5B, at 514, the wireless device may determine an output time associated with an output of the plurality of output devices. For example, referring to FIG. 4A, the wireless device 404 may determine (at 407) a time t at which the audio is output based at least in part on the time the signal 430 is received. In certain configurations, time t may be a predetermined time after the signal 430 is received. When $\theta_1$ is equal to 0°, 180°, or −180°, audio may be output at both the right earphone speaker(s) and the left earphone speaker(s) at time t. In another example, referring to FIG. 4B, the wireless device 404 may determine (at 423) a time t at which to output audio based at least in part on the time the signal 432 is received. In certain configurations, time t may be a predetermined time after the signal 432 is received. When $\theta_2$ is equal to 0°, 180°, or −180°, audio may be output at both the right earphone speaker(s) and the left earphone speaker(s) at time t. In another example, referring to FIG. 4E, the wireless device 404 may determine (at 441) a time t at which to output audio based at least in part on the time the signal 444 is received. For example, time t may be a predetermined time after the signal 444 is received. When 06 is equal to 0°, 180°, or −180°, audio may be output at both the right earphone speaker(s) and the left earphone speaker(s) at time t.

At 516, the wireless device may determine a time delay associated with an audio output at a subset of the plurality of output devices based at least in part on the perceived spatial placement of the at least one signal. In certain aspects, the time delay may be determined based at least in part on whether the second device is positioned to the one or more of left, right, above, or below the first reference point associated with the first device. In certain other aspects, the time delay may be determined based at least in part on whether the first device is positioned to the one or more of left, right, above, or below the second reference point associated with the second device. In certain other aspects, the time delay may be both equal to zero when the second device is positioned along the first reference point or when the first device is positioned along the second reference point. For example, referring to FIG. 4A, the wireless device 404 may determine (at 409) a time delay Δt associated with an audio output at a subset of the plurality of output devices (e.g., the left earphone speaker(s)) based at least in part on the perceived spatial placement of the signal 430. For example, the subset of the plurality of output devices may be the output devices that are located on the opposite side of the first reference point 410 as compared to the transmitting device 402. In certain aspects, wireless device 404 may access a look-up table to determine the time delay that is correlated with the perceived spatial relationship $\theta_1$ (e.g., determined at 401) of the signal 430. In the example illustrated in FIG. 4A, the subset of the plurality of output devices may include the left earphone speaker(s). In other words, the audio output at the right earphone speaker(s) may occur at time=t, and the audio output at the left earphone speaker(s) may occur at time=t+$\Delta$t, where $\Delta$t=fn($\theta_1$). In another example, referring to FIG. 4B, the wireless device 404 may determine (at 425) a time delay $\Delta t_2$ associated with an audio output at a subset of the plurality of output devices (e.g., the left earphone speaker(s)) based at least in part on the perceived spatial placement $\theta_2$ of the signal 432. For example, wireless device 404 may access a look-up table to determine the second time delay $\Delta t_2$ that is correlated with the perceived spatial relationship $\theta_2$ (e.g., determined at 417) of the signal 432. In the example illustrated in FIG. 4B, the subset of the plurality of output devices may include the right earphone speaker(s). In other words, the audio output at the left earphone speaker(s) may occur at time=t, and the audio output at the right earphone speaker(s) may occur at time=t+$\Delta t_2$, where $\Delta t_2$=fn($\theta_2$). In another example, referring to FIG. 4E, the wireless device 404 may determine (at 443) a time delay $\Delta t_6$ associated with an audio output at a subset of the plurality of output devices (e.g., the right earphone speaker(s)) based at least in part on the perceived spatial placement $\theta_6$ of the signal 444, the position information determined by the camera tracking system 440, and/or the gyroscope tracking device. For example, wireless device 404 may access a look-up table to determine the second time delay $\Delta t_6$ that is correlated with one or more of the perceived spatial placement $\theta_6$ of the signal 444, the position information determined by the camera tracking system 440, and/or the gyroscope tracking device. In the example illustrated in FIG. 4E, the subset of the plurality of output devices may include the right earphone speaker(s). In other words, the audio output at the left earphone speaker(s) may occur at time=t, and the audio output at the right earphone speaker(s) may occur at time=t+$\Delta t_6$, where $\Delta t_6$=fn($\theta_6$). When $\theta_1$, $\theta_2$, and/or $\theta_6$ is equal to 0°, 180°, or −180°, audio may be output at both the right earphone speaker(s) and the left earphone speaker(s) at the respective times $t_1$, $t_2$, $t_3$ and $\Delta t_1$, $\Delta t_2$, and/or $\Delta t_6$ may be equal to zero.

At 518, the wireless device may determine an output intensity associated with an output of the plurality of output devices based at least in part on the signal strength associated with the at least one signal. For example, referring to FIG. 4A, the wireless device 404 may determine (at 411) the intensity $i_1$ with which to use for audio output based on the determined signal strength $r_1$ (e.g., determined at 403). In other words, as the RSSI varies between received signals, the wireless device 404 may increase or decrease the intensity of audio output accordingly based on $i_1$=fn($r_1$). In another example, referring to FIG. 4B, the wireless device 404 may determine (at 427) the intensity $i_2$ with which to output audio based on the determine signal strength (e.g., determined at 419). In other words, as the RSSI varies between received signals, the wireless device 404 may increase or decrease the intensity of audio output accordingly based on $i_2$=fn($r_2$). In another example, referring to FIG. 4E, the wireless device 404 may determine (at 445) the intensity $i_6$ with which to output audio based on the determine signal strength (e.g., determined at 437). In other words, as the RSSI varies between received signals, the wireless device 404 may increase or decrease the intensity of audio output accordingly based on $i_6$=fn($r_6$).

At 520, the wireless device may determine an intensity difference associated with the audio output at the subset of the plurality of output devices based at least in part on one or more of the position of the second device or the signal strength associated with the at least one signal. In certain aspects, the intensity difference may be determined based at least in part on whether the second device is positioned to the one or more of left, right, above, or below the first reference point associated with the first device. In certain other aspects, the intensity difference may be determined based at least in part on whether the first device is positioned to the one or more of left, right, above, or below the second reference point associated with the second device. In certain other aspects, the intensity difference may be equal to zero when the second device is positioned along the first reference point or when the first device is positioned along the second reference point. In one example, referring to FIG. 4A, the wireless device 404 may determine (at 413) an intensity difference $\Delta i_1$ associated with the audio output at the subset of the plurality of output devices based at least in part on the position of the transmitting device 402 (e.g., determined at 405), the perceived spatial placement $\theta_1$ (e.g., determined at 401), and/or the signal strength $r_1$ (e.g., determined at 403) associated with the signal 430. In the example illustrated in FIG. 4A, the subset of the plurality of output devices may include the left earphone speaker(s). For example, wireless device 404 may access a look-up table to determine the first intensity difference that is correlated with one or more of the position of the transmitting device 402 (e.g., determined at 405), the perceived spatial placement $\theta_1$ (e.g., determined at 401), and/or the signal strength $r_1$ (e.g., determined at 403) associated with the signal 430. In another example, referring to FIG. 4B, the wireless device 404 may determine (at 429) an intensity difference $\Delta i_2$ associated with the audio output at the subset of the plurality of output devices based at least in part on one or more of the position of the transmitting device 402 (e.g., determined at 421), the perceived spatial placement $\theta_2$ (e.g., determined at 417), or the signal strength $r_2$ (e.g., determined at 419) associated with the signal 432. In the example illustrated in FIG. 4B, the subset of the plurality of output devices may include the right earphone speaker(s). In certain configurations, wireless device 404 may access a look-up table to determine the intensity difference that is correlated with the position of the transmitting device 402 (e.g., determined at 421), the perceived spatial relationship $\theta_2$ (e.g., determined at 417), and/or the signal strength $r_2$ (e.g., determined at 419). In another example, referring to FIG. 4E, the wireless device 404 may determine (at 447) an intensity difference $\Delta i_6$ associated with the audio output at the subset of the plurality of output devices based at least in part on one or more of the position of the transmitting device 402 (e.g., determined at 439), the perceived spatial placement $\theta_6$ (e.g., determined at 435), or the signal strength $r_6$ (e.g., determined at 437) associated with the signal 444. In the example illustrated in FIG. 4E, the subset of the plurality of output devices may include the right earphone speaker(s). In certain configurations, wireless device 404 may access a look-up table to determine the intensity difference that is correlated with the position of the transmitting device 402 (e.g., determined at 439), the perceived spatial relationship $\theta_6$ (e.g., determined at 435), and/or the signal strength $r_6$ (e.g., determined at 437). When $\theta_1$, $\theta_2$, and/or $\theta_6$ is equal to 0°, 180°, or −180°, audio may be output at both the right earphone speaker(s)

and the left earphone speaker(s) with the respective intensities $i_1$, $i_2$, $i_3$ and $\Delta i_1$, $\Delta i_2$, and/or $\Delta i_6$ may be equal to zero.

Referring to FIG. 5C, at 522, the wireless device may output audio at the plurality of output devices. In certain aspects, the audio may be associated with the at least one signal (e.g., when the at least one signal includes an audio packet). In certain other aspects, the audio may not be associated with the at least one signal (e.g., when the at least one signal is not related to an audio output). In certain other aspects, the at least one signal may be output at a subset of the plurality of output devices based at least in part on the time delay and the intensity difference. In one example, referring to FIG. 4A, the wireless device 404 may output (at 415) the audio at the plurality of output devices (e.g., the left earphone speaker(s) and the right earphone speaker(s)). In one aspect, the audio may be output at the subset of the plurality of output devices (e.g., the left earphone speaker(s)) based at least in part on the first time delay $\Delta t_1$ and the first intensity difference $\Delta i_1$ determined from the look-up table(s). As described above, the time and intensity at which the audio is output (at 415) at the right earphone speaker(s) may be equal to $t_1$ and $i_1$, respectively, and the time and intensity at which the audio is output (at 415) at the left earphone speaker(s) may be $t_1+\Delta t_1$ and $i_1-\Delta i_1$, respectively. In another example, referring to FIG. 4B, the wireless device 404 may output (at 431) the audio at the plurality of output devices (e.g., the left earphone speaker(s) and the right earphone speaker(s)). As described above, the time and intensity at which the audio is output (at 431) at the left earphone speaker(s) may be equal to t and $i_2$, respectively, and the time and intensity at which the signal is output (at 431) at the right earphone speaker(s) may be $t+\Delta t_2$ and $i_2-\Delta i_2$, respectively. In another example, referring to FIG. 4E, the wireless device 404 may output (at 449) the audio at the plurality of output devices (e.g., the left earphone speaker(s) and the right earphone speaker(s)). As described above, the time and intensity at which the signal is output (at 449) at the left earphone speaker(s) may be equal to t and $i_6$, respectively, and the time and intensity at which the signal is output (at 449) at the right earphone speaker(s) may be $t+\Delta t_6$ and $i_6-\Delta i_6$, respectively.

At 524, the wireless device may output the audio at the plurality of output devices by outputting the audio at the set of right output devices using the time delay and the intensity difference when the second device is positioned to the one or more of left, above, or below the first reference point associated with the first device or when the first device is positioned to the one or more of right, above, or below the second reference point associated with the second device. In one example, referring to FIG. 4B, the time and intensity at which the audio is output (at 431) at the right earphone speaker(s) may be $t+\Delta t_2$ and $i_2-\Delta i_2$, respectively. In another example, referring to FIG. 4E, the time and intensity at which the audio is output (at 449) at the right earphone speaker(s) may be $t+\Delta t_6$ and $i_6-\Delta i_6$, respectively.

At 526, the wireless device may output the audio at the plurality of output devices by outputting the audio at the set of left output devices using the output time and the output intensity when the second device is positioned to the one or more of left, above, or below the first reference point associated with the first device or when the first device is positioned to the one or more of right, above, or below the second reference point associated with the second device. In one example, referring to FIG. 4B, the time and intensity at which the audio is output (at 431) at the left earphone speaker(s) may be equal to t and $i_2$, respectively. In another example, referring to FIG. 4E, the time and intensity at which the audio is output (at 449) at the left earphone speaker(s) may be equal to t and $i_6$.

At 528, the wireless device may output the audio at the plurality of output devices by outputting the audio at the set of left output devices using the time delay and the intensity difference when the second device is positioned to the one or more of right, above, or below the first reference point associated with the first device or when the first device is positioned to the one or more of left, above, or below the second reference point associated with the second device. For example, referring to FIG. 4A, the time and intensity at which the audio is output (at 415) at the left earphone speaker(s) may be $t_1+\Delta t_1$ and $i_1-\Delta i_1$, respectively.

At 530, the wireless device may output the audio at the plurality of output devices by outputting the audio at the set of right output devices using the output time and the output intensity when the second device is positioned to the one or more of right, above, or below the first reference point associated with the first device or when the first device is positioned to the one or more of left, above, or below the second reference point associated with the second device. For example, referring to FIG. 4A, the time and intensity at which the audio is output (at 415) at the right earphone speaker(s) may be equal to $t_1$ and $i_1$, respectively.

Figure 6:
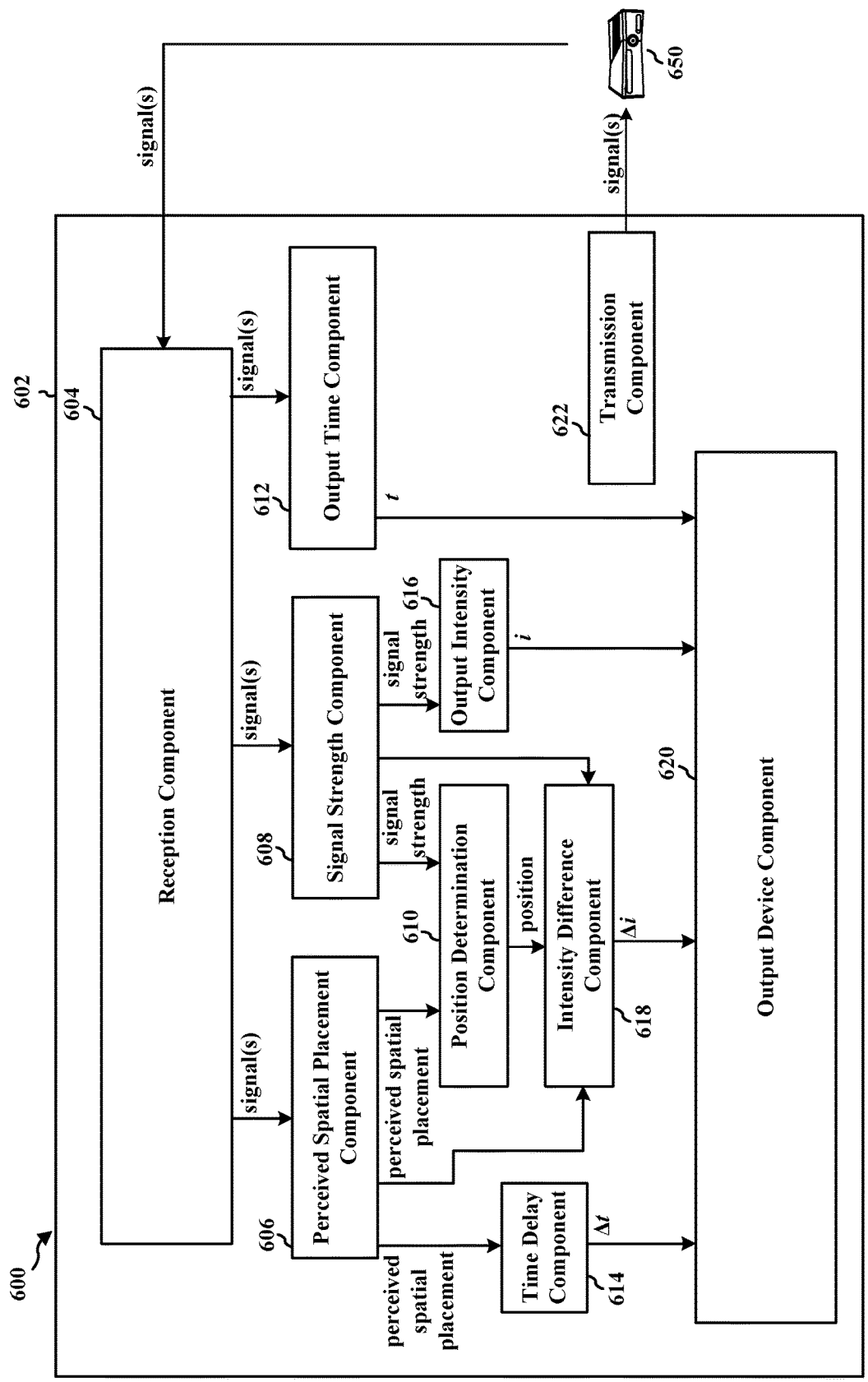
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus may be a first device (e.g., the peripheral device 104, 106, 108, 110, 112, 114a, 114b, the wireless device 200, the apparatus 602/602') in communication with a second device 650 (the central device 102, the transmitting device 402). The apparatus may include a reception component 604, a perceived spatial placement component 606, a signal strength component 608, a position determination component 610, an output time component 612, a time delay component 614, an output intensity component 616, an intensity difference component 618, an output device component 620, and a transmission component 622.

In certain configurations, the reception component 604 may be configured to receive at least one signal from a second device 650. In certain configurations, the at least one signal may include information associated with the camera tracking. The reception component 604 may be configured to send a signal associated with the received at least one signal to the perceived spatial placement component 606, the signal strength component 608, and/or the output time component 612.

In certain other configurations, the perceived spatial placement component 606 may be configured to determine a perceived spatial placement of the at least one signal with respect to one or more of the first device or the second device 650. In certain aspects, the perceived spatial placement is associated with one or more of an AoA, an AoD, camera tracking, or a gyroscope measurement. The perceived spatial placement component 606 may be configured to send a signal associated with the perceived spatial placement to one or more of the position determination component 610, the time delay component 614, and/or the intensity difference component 618.

In certain other configurations, the signal strength component 608 may be configured to determine a signal strength associated with the at least one signal. The signal strength component 608 may be configured to send a signal associated with the signal strength to one or more of the position determination component 610, the output intensity component 616, and/or the intensity difference component 618.

In certain other configurations, the position determination component 610 may be configured to determine a position of the second device 650 relative to the first device based at least in part on a first reference point associated the first device or a second reference point associated with the second device 650. In certain other configurations, the position determination component 610 may be configured to determine a position of the second device 650 relative to the first device based at least in part on a first reference point associated the first device or a second reference point associated with the second device 650 by determining whether the second device 650 is positioned one or more of left, right, above, or below the first reference point associated with the first device. In certain other aspects, the position determination component 610 may be configured to determine a position of the second device 650 relative to the first device based at least in part on a first reference point associated the first device or a second reference point associated with the second device 650 by determining whether the first device is positioned one or more of left, right, above, or below the second reference point associated with the second device 650. In certain aspects, when the position of the second device 650 is determined with respect to the first reference point associated the first device, the position is determined based at least in part on one or more of the AoA or the AoD. In certain other aspects, when the position of the first device is determined with respect to the second reference point associated the second device 650, the position is determined based at least in part on one or more of the camera tracking or the gyroscope measurement. The position determination component 610 may be configured to send a signal associated with the position of the second device 650 to the intensity difference component 618.

In certain other configurations, the output time component 612 may be configured to determine an output time associated with an output of the plurality of output devices. The output time component 612 may be configured to send a signal associated with the time t to the output device component 620.

In certain other configurations, the time delay component 614 may be configured to determine a time delay associated with an audio output at a subset of the plurality of output devices based at least in part on the perceived spatial placement of the at least one signal. In certain aspects, the time delay may be determined based at least in part on whether the second device 650 is positioned to the one or more of left, right, above, or below the first reference point associated with the first device. In certain other aspects, the time delay may be determined based at least in part on whether the first device is positioned to the one or more of left, right, above, or below the second reference point associated with the second device 650. In certain other aspects, the time delay may be both equal to zero when the second device 650 is positioned along the first reference point or when the first device is positioned along the second reference point. The time delay component 614 may be configured to send a signal associated with the time delay Δt to the output device component 620.

In certain other configurations, the output intensity component 616 may be configured to determine an output intensity associated with an output of the plurality of output devices based at least in part on the signal strength associated with the at least one signal. The output intensity component 616 may be configured to send a signal associated with the determined intensity i to the output device component 620.

In certain other configurations, the intensity difference component 618 may be configured to determine an intensity difference associated with the audio output at the subset of the plurality of output devices based at least in part on one or more of the position of the second device 650 or the signal strength associated with the at least one signal. In certain aspects, the intensity difference may be determined based at least in part on whether the second device 650 is positioned to the one or more of left, right, above, or below the first reference point associated with the first device. In certain other aspects, the intensity difference may be determined based at least in part on whether the first device is positioned to the one or more of left, right, above, or below the second reference point associated with the second device 650. In certain other aspects, the intensity difference may be equal to zero when the second device 650 is positioned along the first reference point or when the first device is positioned along the second reference point. The intensity difference component 618 may be configured to send a signal associated with the intensity difference Δi to the output device component 620.

In certain configurations, the output device component 620 may be configured to output the audio at the plurality of output devices. In certain aspects, the audio may be output at the subset of the plurality of output devices based at least in part on the time delay and the intensity difference. In certain aspects, the output device component 620 may include one of more left speakers and one or more right speakers. In certain other aspects, the output device component 620 may be configured to output the audio at the plurality of output devices by outputting the audio at the set of right output devices using the time delay and the intensity difference when the second device is positioned to the one or more of left, above, or below the first reference point associated with the first device or when the first device is positioned to the one or more of right, above, or below the second reference point associated with the second device 650. In certain other configurations, the output device component 620 may be configured to output the audio at the plurality of output devices by outputting the audio at the set of left output devices using the output time and the output intensity when the second device 650 is positioned to the one or more of left, above, or below the first reference point associated with the first device or when the first device is positioned to the one or more of right, above, or below the second reference point associated with the second device 650. In certain other configurations, the output device component 620 may be configured to output the audio at the plurality of output devices by outputting the audio at the set of left output devices using the time delay and the intensity difference when the second device 650 is positioned to the one or more of right, above, or below the first reference point associated with the first device or when the first device is positioned to the one or more of left, above, or below the second reference point associated with the second device 650. In certain other configurations, the output device component 620 may be configured to output the audio at the plurality of output devices by outputting the audio at the set of right output devices using the output time and the output intensity when the second device 650 is positioned to the one or more of right, above, or below the first reference point associated with the first device or when the first device is positioned to the one or more of left, above, or below the second reference point associated with the second device 650.

In certain other configurations, the transmission component 622 may be configured to send one or more signals to the second device 650.

The apparatus may include additional components that perform each of the blocks of the algorithm in the aforementioned flowcharts of FIGS. 5A-5C. As such, each block in the aforementioned flowcharts of FIGS. 5A-5C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
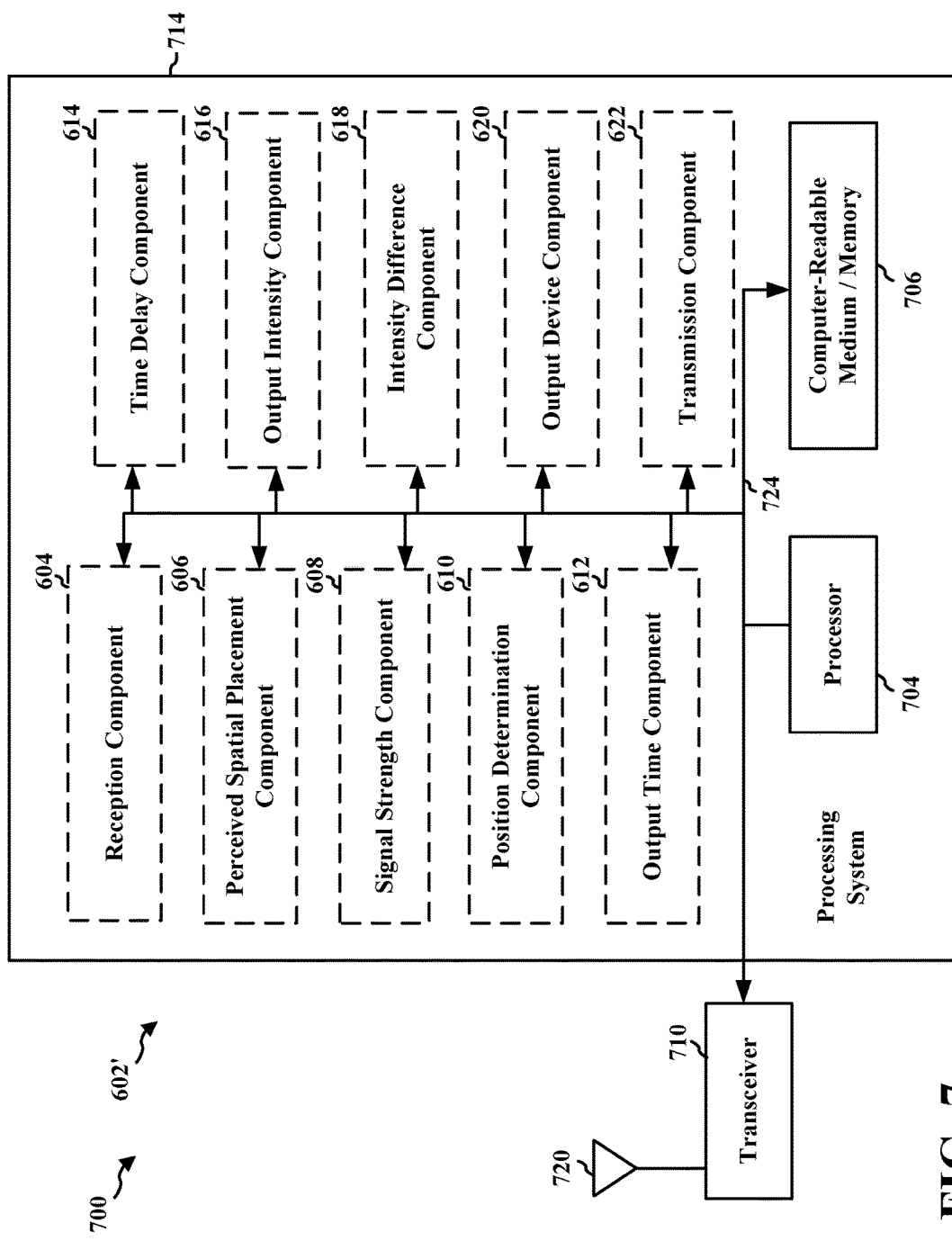
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, 614, 616, 618, 620, 622 and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 622, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612, 614, 616, 618, 620, 622. The components may be software components running in the processor 704, resident/stored in the computer readable medium/memory 706, one or more hardware components coupled to the processor 704, or some combination thereof.

In certain configurations, the apparatus 602/602' for wireless communication may include means for receiving at least one signal from a second device. In certain configurations, the at least one signal may include information associated with the camera tracking. In certain other configurations, the apparatus 602/602' for wireless communication may include means for determining a perceived spatial placement of the at least one signal with respect to one or more of the first device or the second device. In certain aspects, the perceived spatial placement is associated with one or more of an AoA, an AoD, camera tracking, or a gyroscope measurement. In certain other configurations, the apparatus 602/602' for wireless communication may include means for determining a signal strength associated with the at least one signal. In certain other configurations, the apparatus 602/602' for wireless communication may include means for determining a position of the second device relative to the first device based at least in part on a first reference point associated the first device or a second reference point associated with the second device. In certain aspects, when the position of the second device is determined with respect to the first reference point associated the first device, the position is determined based at least in part on one or more of the AoA or the AoD. In certain other aspects, when the position of the first device is determined with respect to the second reference point associated the second device, the position is determined based at least in part on one or more of the camera tracking or the gyroscope measurement. In certain aspects, the means for determining a position of the second device relative to the first device based at least in part on a first reference point associated the first device or a second reference point associated with the second device may be configured to determine whether the second device is positioned one or more of left, right, above, or below the first reference point associated with the first device. In certain other aspects, the means for determining a position of the second device relative to the first device based at least in part on a first reference point associated the first device or a second reference point associated with the second device may be configured to determine whether the first device is positioned one or more of left, right, above, or below the second reference point associated with the second device. In certain other configurations, the apparatus 602/602' for wireless communication may include means for determining an output time associated with an output of the plurality of output devices. In certain other configurations, the apparatus 602/602' for wireless communication may include means for determine a time delay associated with an audio output at a subset of the plurality of output devices based at least in part on the perceived spatial placement of the at least one signal. In certain aspects, the time delay may be determined based at least in part on whether the second device is positioned to the one or more of left, right, above, or below the first reference point associated with the first device. In certain other aspects, the time delay may be determined based at least in part on whether the first device is positioned to the one or more of left, right, above, or below the second reference point associated with the second device. In certain other aspects, the time delay may be both equal to zero when the second device is positioned along the first reference point or when the first device is positioned along the second reference point. In certain other configurations, the apparatus 602/602' for wireless communication may include means for determining an output intensity associated with an output of the plurality of output devices based at least in part on the signal strength associated with the at least one signal. In certain other configurations, the apparatus 602/602' for wireless communication may include means for determining an intensity difference associated with the audio output at the subset of the plurality of output devices based at least in part on one or more of the position of the second device or the signal strength associated with the at least one signal. In certain aspects, the intensity difference may be determined based at least in part on whether the second device is positioned to the one or more of left, right, above, or below the first reference point associated with the first device. In certain other aspects, the intensity difference may be determined based at least in part on whether the first device is positioned to the one or more of left, right, above, or below the second reference point associated with the second device. In certain other aspects, the intensity difference may be equal to zero when the second device is positioned along the first reference point or when the first device is positioned along the second reference point. In certain other configurations, the apparatus 602/602' for wireless communication may include means for outputting the audio at the plurality of output devices. In certain aspects, the audio may be output at the subset of the plurality of output devices based at least in part on the time delay and the intensity difference. In certain aspects, the means for outputting the audio at the plurality of output devices may be configured to output the audio at the set of right output devices using the time delay and the intensity difference when the second device is positioned to the one or more of left, above, or below the first reference point associated with the first device or when the first device is positioned to the one or more of right, above, or below the second reference point associated with the second device. In certain other aspects, the means for outputting the audio at the plurality of output devices may be configured to output the audio at the set of left output devices using the output time and the output intensity when the second device is positioned to the one or more of left, above, or below the first reference point associated with the first device or when the first device is positioned to the one or more of right, above, or below the second reference point associated with the second device. In certain other aspects, the means for outputting the audio at the plurality of output devices may be configured to output the audio at the set of left output devices using the time delay and the intensity difference when the second device is positioned to the one or more of right, above, or below the first reference point associated with the first device or when the first device is positioned to the one or more of left, above, or below the second reference point associated with the second device. In certain other aspects, the means for outputting the audio at the plurality of output devices may be configured to output the audio at the set of right output devices using the output time and the output intensity when the second device is positioned to the one or more of right, above, or below the first reference point associated with the first device or when the first device is positioned to the one or more of left, above, or below the second reference point associated with the second device. The aforementioned means may be the processor(s) 202, the radio 230, the MMU 240, short-range communication controller 252, one or more of the aforementioned components of the apparatus 602 and/or the processing system 714 of the apparatus 602' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a first device having a plurality of audio output devices, comprising:
    receiving, at the first device, at least one audio signal from a second device via a wireless communication link;
    determining a perceived spatial placement of the at least one audio signal, wherein the perceived spatial placement is based on a spatial relationship between the at least one audio signal and the first device or between the at least one audio signal and the second device;
    determining a signal strength associated with the at least one audio signal;
    determining a position of the second device relative to the first device based at least in part on a first reference point associated with the first device or a second reference point associated with the second device;
    determining a time delay associated with an audio output at a subset of the plurality of audio output devices based at least in part on the perceived spatial placement of the at least one audio signal;
    determining an intensity difference associated with the audio output at the subset of the plurality of audio output devices based at least in part on one or more of the position of the second device or the signal strength associated with the at least one audio signal; and
    outputting audio at the plurality of audio output devices, the audio being output at the subset of the plurality of audio output devices based at least in part on the time delay and the intensity difference.

2. The method of claim 1, further comprising:
    determining an output time associated with an output of the plurality of audio output devices.

3. The method of claim 2, further comprising:
determining an output intensity associated with the output of the plurality of audio output devices based at least in part on the signal strength associated with the at least one audio signal.

4. The method of claim 3, wherein the determining the position of the second device relative to the first device comprises:
determining whether the second device is positioned one or more of left, right, above, or below the first reference point associated with the first device; or
determining whether the first device is positioned one or more of left, right, above, or below the second reference point associated with the second device.

5. The method of claim 4, wherein:
the time delay and the intensity difference are determined based at least in part on whether the second device is positioned to the one or more of left, right, above, or below the first reference point associated with the first device; or
the time delay and the intensity difference are determined based at least in part on whether the first device is positioned to the one or more of left, right, above, or below the second reference point associated with the second device.

6. The method of claim 5, wherein the subset of the plurality of audio output devices includes either a set of right output devices or a set of left output devices, and wherein the outputting the audio at the plurality of audio output devices comprises:
outputting the audio at the set of right output devices using the time delay and the intensity difference when the second device is positioned to the one or more of left, above, or below the first reference point associated with the first device or when the first device is positioned to the one or more of right, above, or below the second reference point associated with the second device; and
outputting the audio at the set of left output devices using the output time and the output intensity when the second device is positioned to the one or more of left, above, or below the first reference point associated with the first device or when the first device is positioned to the one or more of right, above, or below the second reference point associated with the second device.

7. The method of claim 6, wherein the outputting the audio at the plurality of audio output devices comprises:
outputting the audio at the set of left output devices using the time delay and the intensity difference when the second device is positioned to the one or more of right, above, or below the first reference point associated with the first device or when the first device is positioned to the one or more of left, above, or below the second reference point associated with the second device; and
outputting the audio at the set of right output devices using the output time and the output intensity when the second device is positioned to the one or more of right, above, or below the first reference point associated with the first device or when the first device is positioned to the one or more of left, above, or below the second reference point associated with the second device.

8. The method of claim 7, wherein the time delay and the intensity difference are both equal to zero when the second device is positioned along the first reference point or when the first device is positioned along the second reference point.

9. The method of claim 1, wherein the perceived spatial placement is associated with one or more of an angle of arrival (AoA), an angle of departure (AoD), camera tracking, or a gyroscope measurement.

10. The method of claim 9, wherein when the position of the second device is determined with respect to the first reference point associated the first device, the position is determined based at least in part on one or more of the AoA or the AoD of the at least one audio signal.

11. The method of claim 9, wherein when the position of the first device is determined with respect to the second reference point associated the second device, the position is determined based at least in part on one or more of the camera tracking or the gyroscope measurement.

12. The method of claim 11, wherein the at least one audio signal includes information associated with the camera tracking.

13. An apparatus for wireless communication for a first device with a plurality of audio output devices, comprising:
means for receiving, at the first device, at least one audio signal from a second device;
means for determining a perceived spatial placement of the at least one signal, wherein the perceived spatial placement is based on a spatial relationship between the at least one signal and the first device or between the at least one signal and the second device;
means for determining a signal strength associated with the at least one audio signal;
means for determining a position of the second device relative to the first device based at least in part on a first reference point associated with the first device or a second reference point associated with the second device;
means for determining a time delay associated with an audio output at a subset of the plurality of audio output devices based at least in part on the perceived spatial placement of the at least one audio signal;
means for determining an intensity difference associated with the audio output at the subset of the plurality of audio output devices based at least in part on one or more of the position of the second device or the signal strength associated with the at least one audio signal; and
means for outputting audio at the plurality of audio output devices, the audio being output at the subset of the plurality of audio output devices based at least in part on the time delay and the intensity difference.

14. The apparatus of claim 13, further comprising:
means for determining an output time associated with an output of the plurality of audio output devices.

15. The apparatus of claim 14, further comprising:
means for determining an output intensity associated with an output of the plurality of audio output devices based at least in part on the signal strength associated with the at least one audio signal.

16. The apparatus of claim 15, wherein the means for determining the position of the second device relative to the first device is configured to:
determine whether the second device is positioned one or more of left, right, above, or below the first reference point associated with the first device; or
determine whether the first device is positioned one or more of left, right, above, or below the second reference point associated with the second device.

17. The apparatus of claim 16, wherein:
the time delay and the intensity difference is determined based at least in part on whether the second device is positioned to the one or more of left, right, above, or below the first reference point associated with the first device; or the time delay and the intensity difference is determined based at least in part on whether the first device is positioned to the one or more of left, right, above, or below the second reference point associated with the second device.

18. The apparatus of claim 17, wherein the subset of the plurality of audio output devices includes either a set of right output devices or a set of left output devices, and wherein the means for outputting the audio at the plurality of audio output devices is configured to:

output the audio at the set of right output devices using the time delay and the intensity difference when the second device is positioned to the one or more of left, above, or below the first reference point associated with the first device or when the first device is positioned to the one or more of right, above, or below the second reference point associated with the second device; and output the audio at the set of left output devices using the output time and the output intensity when the second device is positioned to the one or more of left, above, or below the first reference point associated with the first device or when the first device is positioned to the one or more of right, above, or below the second reference point associated with the second device.

19. The apparatus of claim 18, wherein the means for outputting the audio at the plurality of audio output devices is configured to:

output the audio at the set of left output devices using the time delay and the intensity difference when the second device is positioned to the one or more of right, above, or below the first reference point associated with the first device or when the first device is positioned to the one or more of left, above, or below the second reference point associated with the second device; and output the audio at the set of right output devices using the output time and the output intensity when the second device is positioned to the one or more of right, above, or below the first reference point associated with the first device or when the first device is positioned to the one or more of left, above, or below the second reference point associated with the second device.

20. The apparatus of claim 19, wherein the time delay and the intensity difference are both equal to zero when the second device is positioned along the first reference point or when the first device is positioned along the second reference point.

21. The apparatus of claim 13, wherein the perceived spatial placement is associated with one or more of an angle of arrival (AoA), an angle of departure (AoD), camera tracking, or a gyroscope measurement.

22. The apparatus of claim 21, wherein when the position of the second device is determined with respect to the first reference point associated the first device, the position is determined based at least in part on one or more of the AoA or the AoD of the at least one audio signal.

23. The apparatus of claim 21, wherein when the position of the first device is determined with respect to the second reference point associated the second device, the position is determined based at least in part on one or more of the camera tracking or the gyroscope measurement.

24. The apparatus of claim 23, wherein the at least one audio signal includes information associated with the camera tracking.

25. An apparatus for wireless communication for a first device with a plurality of audio output devices, comprising:

a memory; and at least one processor coupled to the memory and configured to:

receive, at the first device, at least one audio signal from a second device via a wireless communication link;

determine a perceived spatial placement of the at least one signal, wherein the perceived spatial placement is based on a spatial relationship between the at least one signal and the first device or between the at least one signal and the second device;

determine a signal strength associated with the at least one audio signal;

determine a position of the second device relative to the first device based at least in part on a first reference point associated with the first device or a second reference point associated with the second device;

determine a time delay associated with an audio output at a subset of the plurality of audio output devices based at least in part on the perceived spatial placement of the at least one audio signal;

determine an intensity difference associated with the audio output at the subset of the plurality of audio output devices based at least in part on one or more of the position of the second device or the signal strength associated with the at least one audio signal; and output audio at the plurality of audio output devices, the audio being output at the subset of the plurality of audio output devices based at least in part on the time delay and the intensity difference.

26. The apparatus of claim 25, wherein the at least one processor is further configured to:

determine an output time associated with an output of the plurality of audio output devices.

27. The apparatus of claim 26, wherein the at least one processor is further configured to:

determine an output intensity associated with an output of the plurality of audio output devices based at least in part on the signal strength associated with the at least one audio signal.

28. The apparatus of claim 27, wherein the at least one processor is configured to determine the position of the second device relative to the first device by:

determining whether the second device is positioned one or more of left, right, above, or below the first reference point associated with the first device; or determining whether the first device is positioned one or more of left, right, above, or below the second reference point associated with the second device.

29. The apparatus of claim 28, wherein:

the time delay and the intensity difference is determined based at least in part on whether the second device is positioned to the one or more of left, right, above, or below the first reference point associated with the first device; or the time delay and the intensity difference is determined based at least in part on whether the first device is positioned to the one or more of left, right, above, or below the second reference point associated with the second device.

30. The apparatus of claim 29, wherein the subset of the plurality of audio output devices includes either a set of right output devices or a set of left output devices, and wherein the at least one processor is configured to output the audio at the plurality of audio output devices by:
outputting the audio at the set of right output devices using the time delay and the intensity difference when the second device is positioned to the one or more of left, above, or below the first reference point associated with the first device or when the first device is positioned to the one or more of right, above, or below the second reference point associated with the second device; and
outputting the audio at the set of left output devices using the output time and the output intensity when the second device is positioned to the one or more of left, above, or below the first reference point associated with the first device or when the first device is positioned to the one or more of right, above, or below the second reference point associated with the second device.

31. The apparatus of claim 30, wherein the at least one processor is configured to output the audio at the plurality of audio output devices by:
outputting the audio at the set of left output devices using the time delay and the intensity difference when the second device is positioned to the one or more of right, above, or below the first reference point associated with the first device or when the first device is positioned to the one or more of left, above, or below the second reference point associated with the second device; and
outputting the audio at the set of right output devices using the output time and the output intensity when the second device is positioned to the one or more of right, above, or below the first reference point associated with the first device or when the first device is positioned to the one or more of left, above, or below the second reference point associated with the second device.

32. The apparatus of claim 31, wherein the time delay and the intensity difference are both equal to zero when the second device is positioned along the first reference point or when the first device is positioned along the second reference point.

33. The apparatus of claim 25, wherein the perceived spatial placement is associated with one or more of an angle of arrival (AoA), an angle of departure (AoD), camera tracking, or a gyroscope measurement.

34. The apparatus of claim 33, wherein when the position of the second device is determined with respect to the first reference point associated the first device, the position is determined based at least in part on one or more of the AoA or the AoD of the at least one audio signal.

35. The apparatus of claim 33, wherein when the position of the first device is determined with respect to the second reference point associated the second device, the position is determined based at least in part on one or more of the camera tracking or the gyroscope measurement.

36. The apparatus of claim 35, wherein the at least one audio signal includes information associated with the camera tracking.

37. A non-transitory computer-readable medium storing computer executable code for a first device with a plurality of audio output devices, comprising code to: receive, at the first device, at least one audio signal from a second device via a wireless communication link; determine a perceived spatial placement of the at least one signal, wherein the perceived spatial placement is based on a spatial relationship between the at least one signal and the first device or between the at least one signal and the second device; determine a signal strength associated with the at least one audio signal; determine a position of the second device relative to the first device based at least in part on a first reference point associated with the first device or a second reference point associated with the second device; determine a time delay associated with an audio output at a subset of the plurality of audio output devices based at least in part on the perceived spatial placement of the at least one audio signal; determine an intensity difference associated with the audio output at the subset of the plurality of audio output devices based at least in part on one or more of the position of the second device or the signal strength associated with the at least one audio signal; and output audio at the plurality of audio output devices, the audio being output at the subset of the plurality of audio output devices based at least in part on the time delay and the intensity difference.

38. The computer-readable medium of claim 37, further comprising code to:
determine an output time associated with an output of the plurality of audio output devices.

39. The computer-readable medium of claim 38, further comprising code to:
determine an output intensity associated with an output of the plurality of audio output devices based at least in part on the signal strength associated with the at least one audio signal.

40. The computer-readable medium of claim 39, wherein the code to determine the position of the second device relative to the first device is configured to:
determine whether the second device is positioned one or more of left, right, above, or below the first reference point associated with the first device; or
determine whether the first device is positioned one or more of left, right, above, or below the second reference point associated with the second device.

41. The computer-readable medium of claim 40, wherein:
the time delay and the intensity difference is determined based at least in part on whether the second device is positioned to the one or more of left, right, above, or below the first reference point associated with the first device; or
the time delay and the intensity difference is determined based at least in part on whether the first device is positioned to the one or more of left, right, above, or below the second reference point associated with the second device.

42. The computer-readable medium of claim 41, wherein the subset of the plurality of audio output devices includes either a set of right output devices or a set of left output devices, and wherein the code to output the audio at the plurality of audio output devices is configured to:
output the audio at the set of right output devices using the time delay and the intensity difference when the second device is positioned to the one or more of left, above, or below the first reference point associated with the first device or when the first device is positioned to the one or more of right, above, or below the second reference point associated with the second device; and
output the audio at the set of left output devices using the output time and the output intensity when the second device is positioned to the one or more of left, above, or below the first reference point associated with the first device or when the first device is positioned to the one or more of right, above, or below the second reference point associated with the second device.

43. The computer-readable medium of claim 42, wherein the code to output the audio at the plurality of audio output devices is configured to:

output the audio at the set of left output devices using the time delay and the intensity difference when the second device is positioned to the one or more of right, above, or below the first reference point associated with the first device or when the first device is positioned to the one or more of left, above, or below the second reference point associated with the second device; and output the audio at the set of right output devices using the output time and the output intensity when the second device is positioned to the one or more of right, above, or below the first reference point associated with the first device or when the first device is positioned to the one or more of left, above, or below the second reference point associated with the second device.

44. The computer-readable medium of claim 43, wherein the time delay and the intensity difference are both equal to zero when the second device is positioned along the first reference point or when the first device is positioned along the second reference point.

45. The computer-readable medium of claim 37, wherein the perceived spatial placement is associated with one or more of an angle of arrival (AoA), an angle of departure (AoD), camera tracking, or a gyroscope measurement.

46. The computer-readable medium of claim 45, wherein when the position of the second device is determined with respect to the first reference point associated the first device, the position is determined based at least in part on one or more of the AoA or the AoD of the at least one audio signal.

47. The computer-readable medium of claim 45, wherein when the position of the first device is determined with respect to the second reference point associated the second device, the position is determined based at least in part on one or more of the camera tracking or the gyroscope measurement.

48. The computer-readable medium of claim 47, wherein the at least one audio signal includes information associated with the camera tracking.

* * * * *